(12) United States Patent
Stockwell

(10) Patent No.: US 7,749,762 B2
(45) Date of Patent: Jul. 6, 2010

(54) TEST METHODS FOR SIMULATING FCC REGENERATOR CATALYSIS AND CATALYST DEACTIVATION

(75) Inventor: David Matheson Stockwell, Westfield, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 886 days.

(21) Appl. No.: 11/607,365

(22) Filed: Dec. 1, 2006

(65) Prior Publication Data

US 2007/0166826 A1    Jul. 19, 2007

Related U.S. Application Data

(60) Provisional application No. 60/741,331, filed on Dec. 1, 2005, provisional application No. 60/782,501, filed on Mar. 15, 2006.

(51) Int. Cl.
*G01N 31/10* (2006.01)
*B01J 38/14* (2006.01)
*B01J 38/30* (2006.01)

(52) U.S. Cl. .................. 436/37; 436/134; 436/136; 436/139; 436/140; 436/141; 436/142; 436/159; 436/160; 502/34; 502/38; 502/41; 502/42; 502/51; 502/52; 502/501; 502/514

(58) Field of Classification Search .................. 436/37, 436/134, 136, 139–142, 159–160, 183; 502/34, 502/38, 41–42, 51–52, 501, 514
See application file for complete search history.

(56) References Cited

U.S. PATENT DOCUMENTS

| | | | | | |
|---|---|---|---|---|---|
| 3,197,399 | A | * | 7/1965 | Wight et al. | 208/111.25 |
| 3,287,257 | A | * | 11/1966 | Hass et al. | 208/111.15 |
| 4,072,600 | A | * | 2/1978 | Schwartz | 208/120.05 |
| 4,157,315 | A | * | 6/1979 | Michels et al. | 502/245 |
| 4,276,149 | A | * | 6/1981 | Chester et al. | 208/120.01 |
| 4,280,895 | A | * | 7/1981 | Stuntz et al. | 208/113 |
| 4,298,459 | A | * | 11/1981 | Tatterson et al. | 208/120.15 |
| 5,082,814 | A | * | 1/1992 | Stockwell et al. | 502/68 |
| 5,364,517 | A | * | 11/1994 | Dieckmann et al. | 208/121 |
| 6,350,421 | B1 | * | 2/2002 | Strehlau et al. | 423/213.2 |
| 6,673,235 | B2 | * | 1/2004 | Harris et al. | 208/120.01 |
| 6,716,338 | B2 | * | 4/2004 | Madon et al. | 208/120.01 |

OTHER PUBLICATIONS

Cimbalo, R. N. et al, Oil & Gas Journal 1972, 70, No. 20, 112-122.*

(Continued)

*Primary Examiner*—Arlen Soderquist
(74) *Attorney, Agent, or Firm*—Raymond F. Keller

(57) ABSTRACT

A method for testing the performance of catalysts used for conversion of FCC regenerator gases comprises subjecting the catalyst simultaneously to a mixture of gases including an oxidizing gas and a reducing gas in more than one cycle in which the ratio of the oxidizing gas to the reducing gas varies over the time of the cycle. Test gases comprising $O_2$, CO, $CO_2$, steam, nitrogen-containing gases and sulfur-containing gases in which the ratio of $O_2$ to CO varies over time for each cycle and in which the products of combustion formed during each cycle can be measured periodically over the cycle yields important data on the usefulness of the catalysts for treatment of regenerator flue gas.

20 Claims, 25 Drawing Sheets

OTHER PUBLICATIONS

Rheaume, L. et al, Oil & Gas Journal 1976, 74, No. 20, 103-110.*
Wormsbecher, R. F. et al, Journal of Catalysis 1986, 100, 130-137.*
Chester, A. W., Industrial & Engineering Chemistry Research 1987, 26, 863-869.*
Steingaszner, P. et al, Studies in Surface Science and Catalysis (Catalyst deactivation 1987: Proceedings of the 4th International Symposium) 1987, 34, 451-457.*
Furimsky E., Applied Catalysis 1988, 44, 189-198.*
Steingaszner, P. et al, Studies in Surface Science and Catalysis (Catalysts in Petroleum Refining 1989, Proceedings of the Conference on Catalysts in Petroleum Refining) 1989, 53, 565-575.*
Gerritsen, L. A. et al, Catalysis Today 1991, 11, 61-72.*
Petunchi, J. O. et al, Journal of Physical Chemistry 1992, 96, 9967-9975.*
Cheng, W.-C. et al, Applied Catalysis A 1993, 103, 87-103.*
O'Connor, P. et al, ACS Symposium Series, 1996, vol. 634 "Deactivation and Testing of Hydrocarbon-Processing Catalysts", Chapter 10, 147-158.*
Efthimiadis, E. A. et al, Industrial & Engineering Chemistry Research 2002, 41, 5401-5409.*
Park, S. K. et al, Industrial & Engineering Chemistry research 2003, 42, 736-742.*
Iliopoulou, E. F. et al, Applied Catalysis B: Environmental 2004, 47, 165-175.*
Krishnaiah, G. et al, Studies in Surface Science and Catalysis 2004, 149, 189-202.*
Martinez-Arias, A. et al, Journal of Physical Chemistry B 2004, 108, 17983-17991.*

* cited by examiner

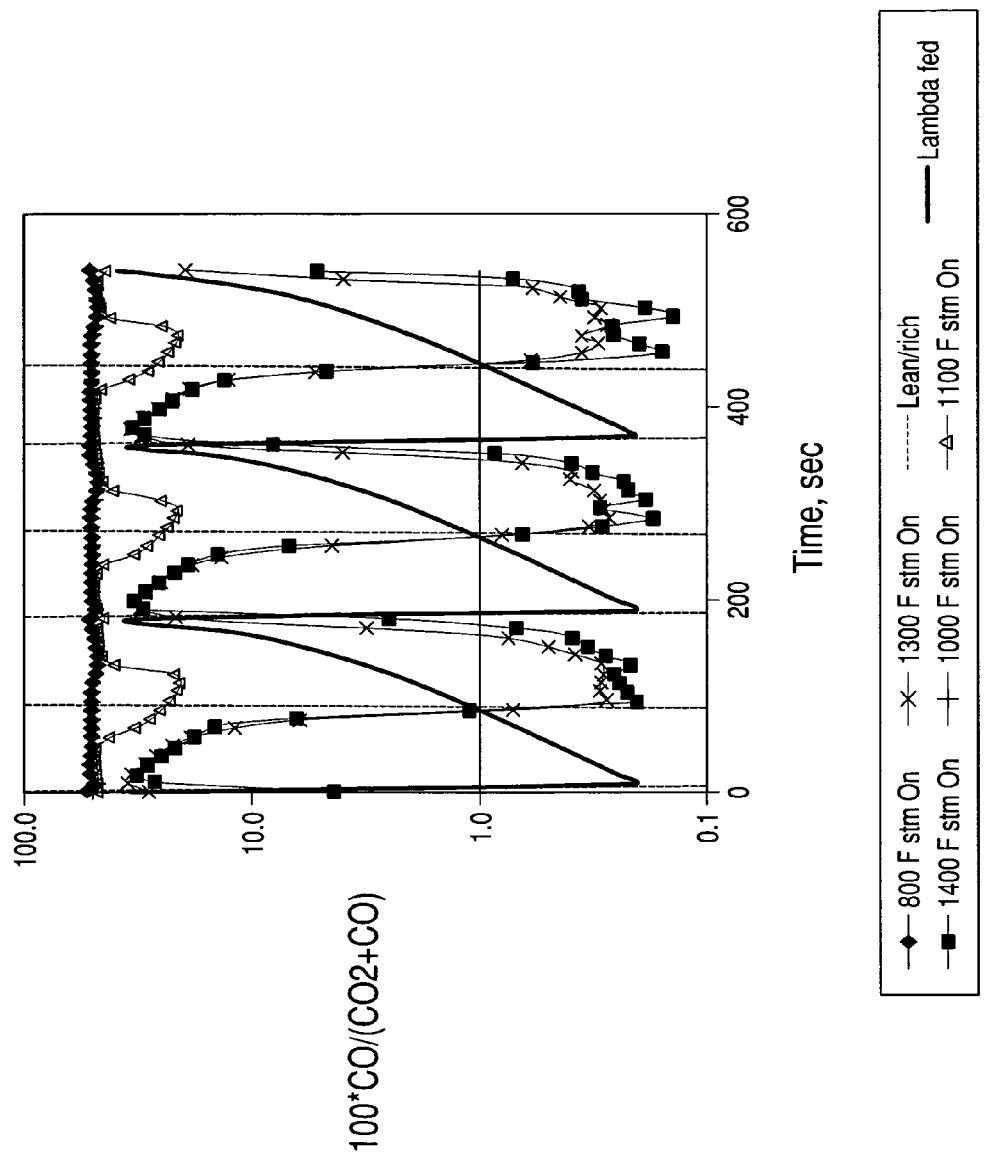

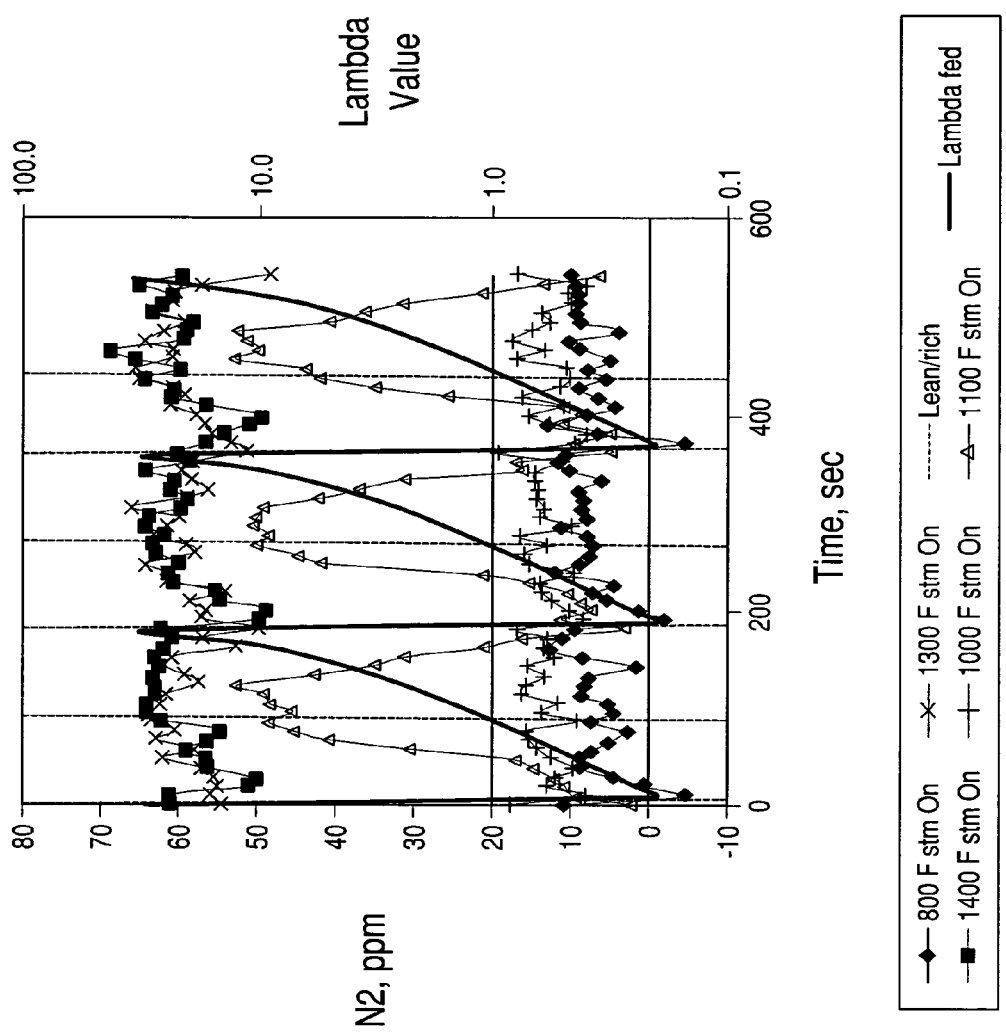

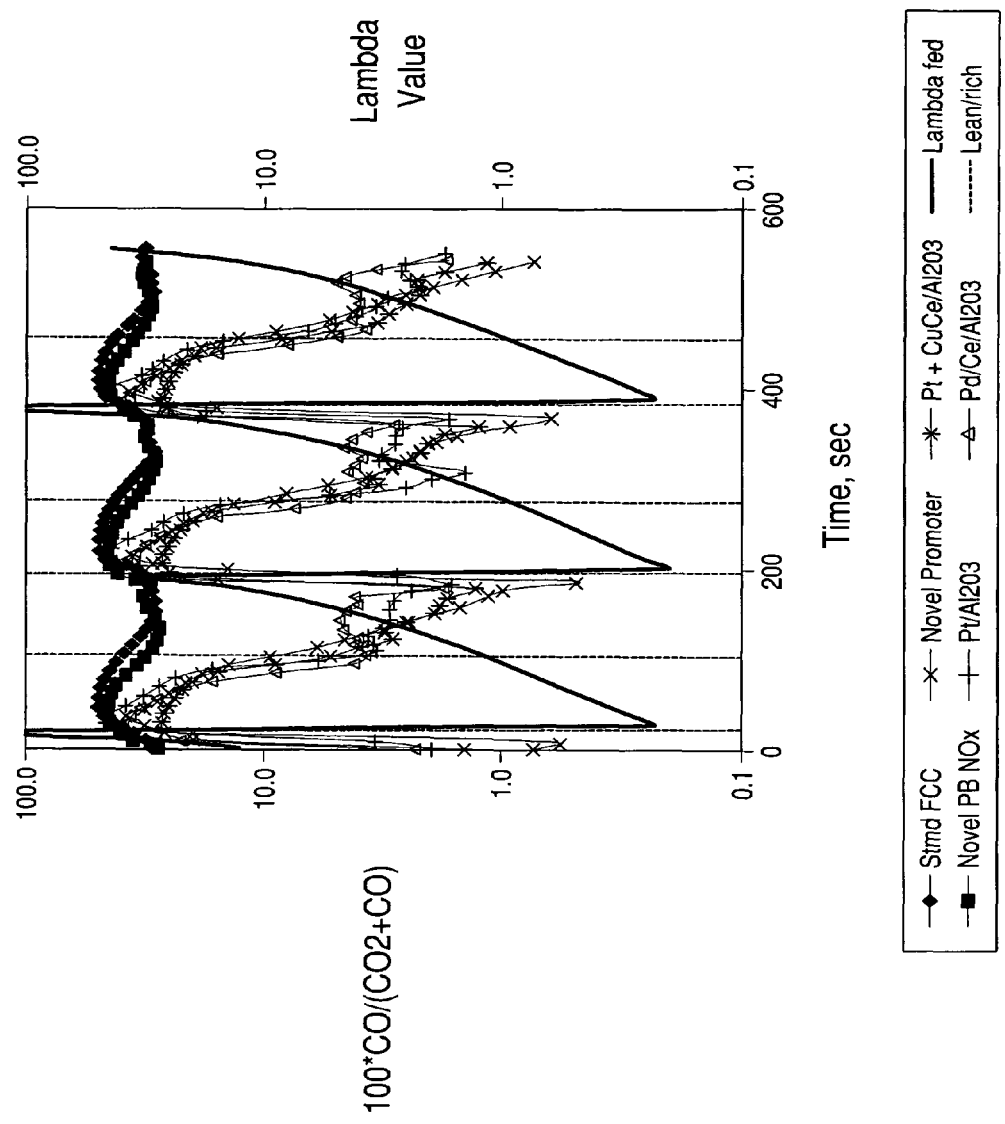

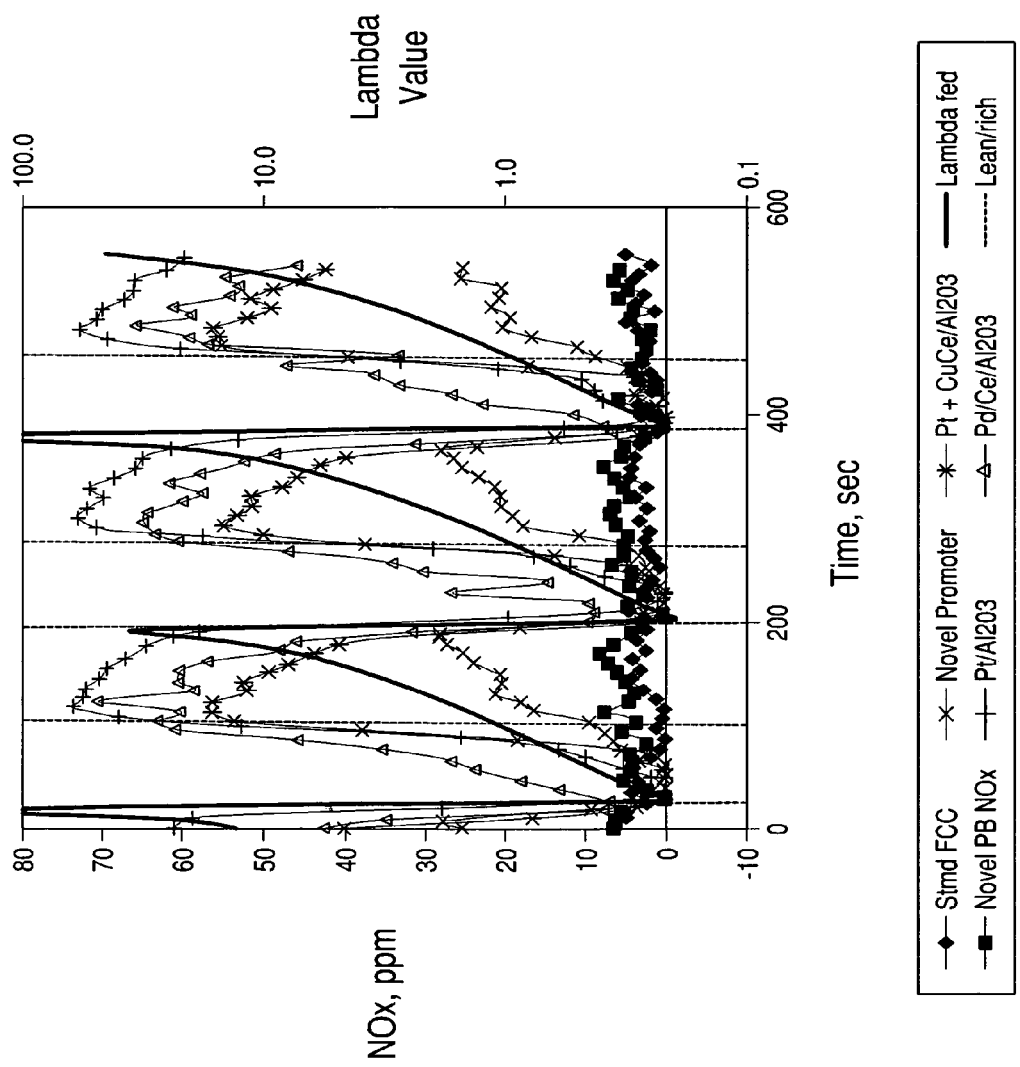

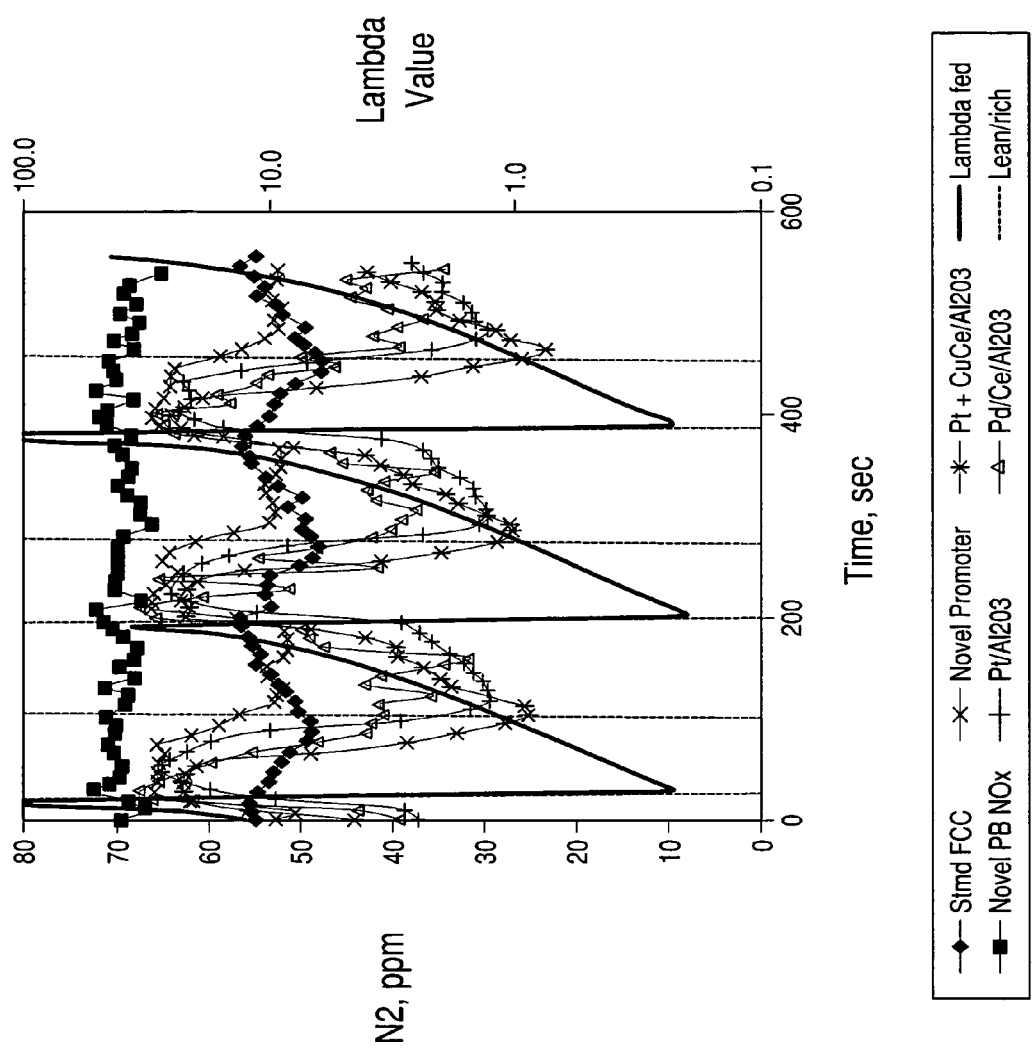

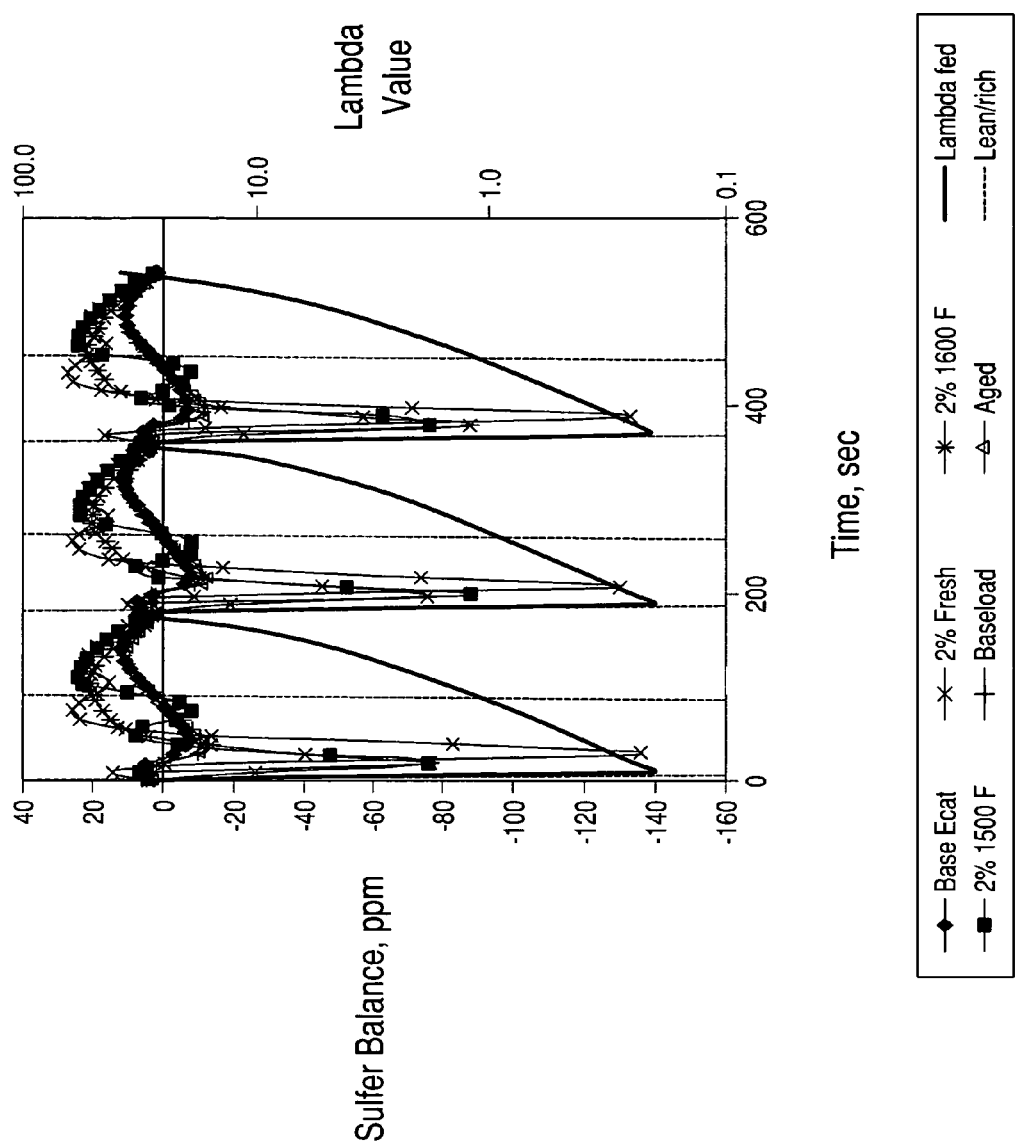

TEST METHODS FOR SIMULATING FCC REGENERATOR CATALYSIS AND CATALYST DEACTIVATION

CROSS REFERENCE TO RELATED APPLICATIONS

This application claims priority to provisional applications U.S. Ser. Nos. 60/741,331, filed Dec. 1, 2005 and 60/782,501 filed Mar. 15, 2006.

FIELD OF THE INVENTION

This invention relates to a method of testing the performance of catalysts used for conversion of FCC regenerator gases. The invention also provides a method of catalyst aging.

BACKGROUND OF THE INVENTION

Catalytic cracking of heavy petroleum fractions is one of the major refining operations employed in the conversion of crude petroleum oils to useful products such as the fuels utilized by internal combustion engines. In fluidized catalytic cracking (FCC) processes, high molecular weight hydrocarbon liquids and vapors are contacted with hot, finely-divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

Test methods for fluid catalytic cracking are well established and in some cases commercially available, so long as one is considering the hydrocarbon cracking portion of the process that takes place in the riser. Fixed bed MAT is defined by an ASTM method. The ACE™ fixed fluidized bed and a circulating riser pilot plant test units are sold commercially. These standard methods were designed to give information on the yields of cracked products from hydrocarbon feeds.

In the catalytic cracking of hydrocarbons, some nonvolatile carbonaceous material or coke is deposited on the catalyst particles. Coke comprises highly condensed aromatic hydrocarbons. When the hydrocarbon feedstock contains organic sulfur and nitrogen compounds, the coke also contains sulfur and nitrogen. As coke accumulates on the cracking catalyst, the activity of the catalyst for cracking and the selectivity of the catalyst for producing gasoline blending stocks diminishes. Catalyst which has become substantially deactivated through the deposit of coke is continuously withdrawn from the reaction zone. This deactivated catalyst is conveyed to a stripping zone where volatile deposits are removed with an inert gas or steam at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from the catalyst surfaces with an oxygen containing gas, such as air. The combustion of these coke deposits can be regarded, in a simplified manner, as the oxidation of $C_1H_1$. The products from such combustion are water, carbon monoxide and carbon dioxide.

The waste gas stream from the combustion process is called flue gas. High residual concentrations of carbon monoxide in flue gases from regenerators have been a problem since the inception of catalytic cracking processes. The evolution of FCC has resulted in the use of increasingly high temperatures in FCC regenerators in order to achieve the required low carbon levels in the regenerated catalysts. Typically, present day regenerators now operate at temperatures in the range of about 1100° F. to 1400° F. When no CO oxidation promoter is used, the flue gases may have a $CO_2/CO$ ratio in the range of 1-3. The oxidation of carbon monoxide is highly exothermic and can result in so-called carbon monoxide "afterburning" which can take place in the dilute catalyst phase (freeboard region), in the cyclones or in the flue gas lines. Afterburning has caused significant damage to plant equipment. On the other hand, unburned carbon monoxide in atmosphere-vented flue gases represents a loss of fuel value and is ecologically undesirable.

Restrictions on the amount of carbon monoxide which can be exhausted into the atmosphere and the process advantages resulting from more complete oxidation of carbon monoxide have stimulated several approaches to achieve complete combustion, also known as "full burn," of carbon monoxide in the regenerator. Since the coke often contains nitrogen and sulfur, under full burn conditions, the flue gas also contains NOx and SOx components.

As opposed to complete CO combustion, FCC catalyst regenerators may be operated in an incomplete mode of combustion, and these are commonly called "partial burn" units. Incomplete CO combustion leaves a relatively large amount of coke on the regenerated catalyst which is passed from an FCC regeneration zone to an FCC reaction zone. The relative content of CO in the regenerator flue gas is relatively high, i.e., about 1 to 10 volume percent. A key feature of partial combustion mode FCC is that the heat effect of coke burning per weight of coke is reduced because the exothermic CO combustion reaction is suppressed. This enables higher throughput of oil and lower regenerator temperatures, and preservation of these benefits is essential to the economics of the partial burn FCC process. Under incomplete combustion operation NOx may not be observed in the regenerator flue gas, but sizable amounts of ammonia and HCN are normally present in the flue gas.

Different reactants and products of interest are found in the regenerator compared to gaseous products found in the FCC reactor. When coke is burned, it generates $CO_2$, CO, and $H_2O$ at percent levels, and ppm levels of $SO_2$, HCN, $NH_3$ and NO, and lesser amounts of COS, $NO_2$, $N_2O$ and other nitrogen oxides. $H_2$ and $H_2S$ might also be formed under some circumstances. CO and many of these ppm-level gases are toxic and are regulated emissions. Cracking catalyst additives have been developed to control the concentrations of the emissions in the regenerator flue gases. Development of such important catalyst additives has been hindered however for lack of performance test methods that can both realistically and conveniently emulate the regenerator environment which the catalyst and additives function in, and which also provide the maximum kinetic and chemical information possible about the regeneration system.

While certain fluid bed or circulating pilot plants burn coke on spent catalyst and can be asserted to be relevant to coke combustion and catalysis in the regenerator, the pilot plants were not specifically designed for maximum utility in cracking catalyst regeneration studies. One skilled in the art expects that there will be false positives and false negatives associated with testing done in apparatus that were not specifically engineered to remove artifacts of the processing and systematic errors, especially if there was no deliberate investigation of such possibilities. Indeed, this has been found to be the case. Improvements in analysis of FCC regeneration are therefore needed.

Transient test methods and the results thereof have long been known to provide higher information content than steady state reaction methods in catalysis and reaction engineering. This is because a wide variety of process conditions are inherently employed and because there is the possibility of transient accumulation of species on the catalyst or in the reactor. More robust logical, kinetic and process models result from simulation of transient data sets because such testing involves wide variations of concentration and accumulation effects that often reveal information on reaction intermediates formed during catalysis. Such data sets are more suitable for testing kinetic and logical models.

Batch-wise coke burning with freshly deposited coke is a transient method and thus rich in kinetic information. However, these batch tests can be time consuming, with one cycle taking an hour or more. Typically, just one cycle is run and then the catalyst is discarded. More testing can be done if a master batch of coked catalyst is made and candidate additives are blended and burned with the master batch. Again, however, just one cycle is run on each sample before the sample is discarded. If fixed fluid bed coke combustion is used on catalyst mixtures which can adsorb and store SOx, oxygen or carbon, a separate step is needed to measure the amount of the adsorbed material. This is not normally practiced, and if it is, the kinetics of the removal of these species are not typically measured.

The information content of steady state pilot plant testing is not particularly high as just one test condition is typically run. This one run can take several hours. The apparatus is expensive to build and operate and it requires large volumes of catalyst and feed. It is not generally thought of as useful for the purpose of screening the performance of experimental catalysts, but is sometimes used for confirmation of performance, the assumption of relevance being implied.

Typical CO promoter testing is done without cracking and coke burning. Instead, feed gases such as CO and $O_2$ diluted in $N_2$ are used, and the steady state catalytic oxidation to $CO_2$ is measured. Sulfur and steam are well known poisons for many catalysts and reactions but these gases are frequently omitted for the sake of convenience. NOx and its precursors are not normally present. Separately, this testing is sometimes conducted at temperatures well below the regenerator temperature, in order to eliminate homogeneous combustion, exotherms, and make the rates easily measured and distinguished. Test results obtained without the important catalyst poisons or at non-representative temperatures run the risk of being misleading or irrelevant.

In addition to the need to assess regenerator environmental additives, the regenerator is thought to cause most of the irreversible catalyst deactivation during FCC. This not only includes zeolite and matrix components of the FCC catalyst, but also deactivation of materials used to trap contaminant metals, of environmental additives used to reduce toxins such as SOx, NOx, CO, and of gasoline sulfur reduction additives. The lifetimes of SOx and CO reduction additives are known to be short in practice, two days or roughly eight hours, respectively, but realistic and convenient deactivation methods proven to be suitable for these additives are lacking. For materials that deactivate quickly, aging methods that operate on the time scale of the regenerator are convenient. For materials that deactivate more slowly, accelerated aging is desirable. Such aging methods would be useful in the development of additives with improved lifetimes, or in the evaluation of additives being considered for purchase and use in a refinery.

Standard methods of aging catalysts include treatment in 100% steam or blends of steam and air, cyclic propylene steaming (CPS) that alternates between oxidation and reduction with propylene, and cracking-regeneration cycles in a fixed fluid bed or circulating pilot plant.

Standard steaming methods for aging catalysts lack oxidation-reduction cycles and do not include reactive gases such as $CO_2$, CO, and SOx. For example, the formation of $MgSO_4$ in a SOx reduction additive could be a key deactivation mechanism in the refinery, but this reaction is excluded in a simple steaming method. CPS steaming includes oxidation-reduction cycles and SOx, but excludes $CO_2$, CO and sulfur from the reducing gas and ensures that propylene and $O_2$ fed during the process do not mix during the cycling. In practice, $CO_2$ may carbonate sodium in the catalyst, reducing the vanadium-sodium synergy which collapses the zeolite in typical procedures. In addition, exclusion of CO—$O_2$ blending prevents the exothermic combustion on CO promoters which could be expected to accelerate CO promoter deactivation. The propylene used in CPS steaming may be too powerful a reducing agent, possibly leading to inappropriate reduction or carburization of metals. Hydrocarbons such as propylene are not majority species in the regenerator environment. Coke is also deposited on the catalyst during the propylene cycle, and in general it is preferred to burn this coke off the catalyst before running the cracking tests. The vanadium present on a catalyst is more active as V(V) to make coke and $H_2$ than as V(III/IV). Therefore one must do the cracking test after ending the CPS deactivation on a reduction cycle and samples subsequently regenerated in situ cannot be used again. To avoid the inconvenience of the initial coke from propylene, one can do a low temperature burnoff to preserve reduced vanadium and low coke and hydrogen. It is not clear that such refinements will improve the predictiveness of the method for other materials however. Methods not requiring arbitrary coke burnoff or oxidation state adjustment would be useful.

Repeated cycles of cracking and regeneration in fixed fluid beds are practiced in the major laboratories, usually with metal-enriched feeds to simulate Ni, V and Fe deposition in the refinery. These cyclic processes are convenient in that a small amount of catalyst is required and the apparatus is only moderately large. The cyclic processes can also be considered relevant in that both oxidation and reduction cycles are present with sulfur and steam. Typically, however, one oxidation-reduction cycle requires about an hour and the deactivation of a sample requires about a day, so a limited number of oxidation-reduction cycles is run. This process does not lend itself towards screening experimental catalysts and is generally used for more comprehensive testing of favorable samples. The same reservations apply to the use of circulating pilot plants for catalyst and metals deactivation, only more so.

SUMMARY OF THE INVENTION

The present invention provides a novel test method and apparatus for evaluating the performance of candidate additives such as for SOx and NOx reduction and/or for CO promotion for FCC. The new test method provides the higher information content of a transient method, where the presence of oxidation-reduction cycles simulate the cyclical variation in FCC regenerator oxygen, such that the capacity of the additives to adsorb, store, release and/or be poisoned by sulfur, oxygen and carbon can be assessed, and an indefinitely large number of oxidation-reduction cycles may be used. Test gases containing combustion products and air are fed in an air/fuel profile over time (lambda sweep) that has the exponential shape of the oxygen concentration in a fluid bed regenerator model.

In another aspect of the invention, a method to deactivate FCC catalysts and additives is provided which has the abovelisted attributes and can be practiced on a sample size and productivity suitable for screening catalysts. The method is particularly useful for aging transition metals capable of changing oxidation state while in the regenerator, or are subject to sulfating, carbonating, sulfiding and carburizing, or forming mixed metal oxides or alloys. Previous methods do not enable such reactions dynamically within a single reactor with an adjustable, short cycle time.

BRIEF DESCRIPTION OF THE DRAWINGS

FIGS. 7A and 7B are graphs of CO and $N_2$ concentrations, respectively, during a lambda sweep without catalysts and varying temperatures as described in Example 3.

FIGS. 9A and 9B are graphs of CO levels found during lambda sweep testing of various CO oxidation promoters as described in Example 4.

FIGS. 10A and 10B are graphs of NOx and $N_2$, respectively, found during lambda sweep testing of various CO oxidation promoters as described in Example 4.

FIGS. 16A and 16B are plots of sulfur species concentrations found during lambda sweep testing of various fresh and aged catalysts as described in Example 7.

DETAILED DESCRIPTION OF THE INVENTION

Figure 1:
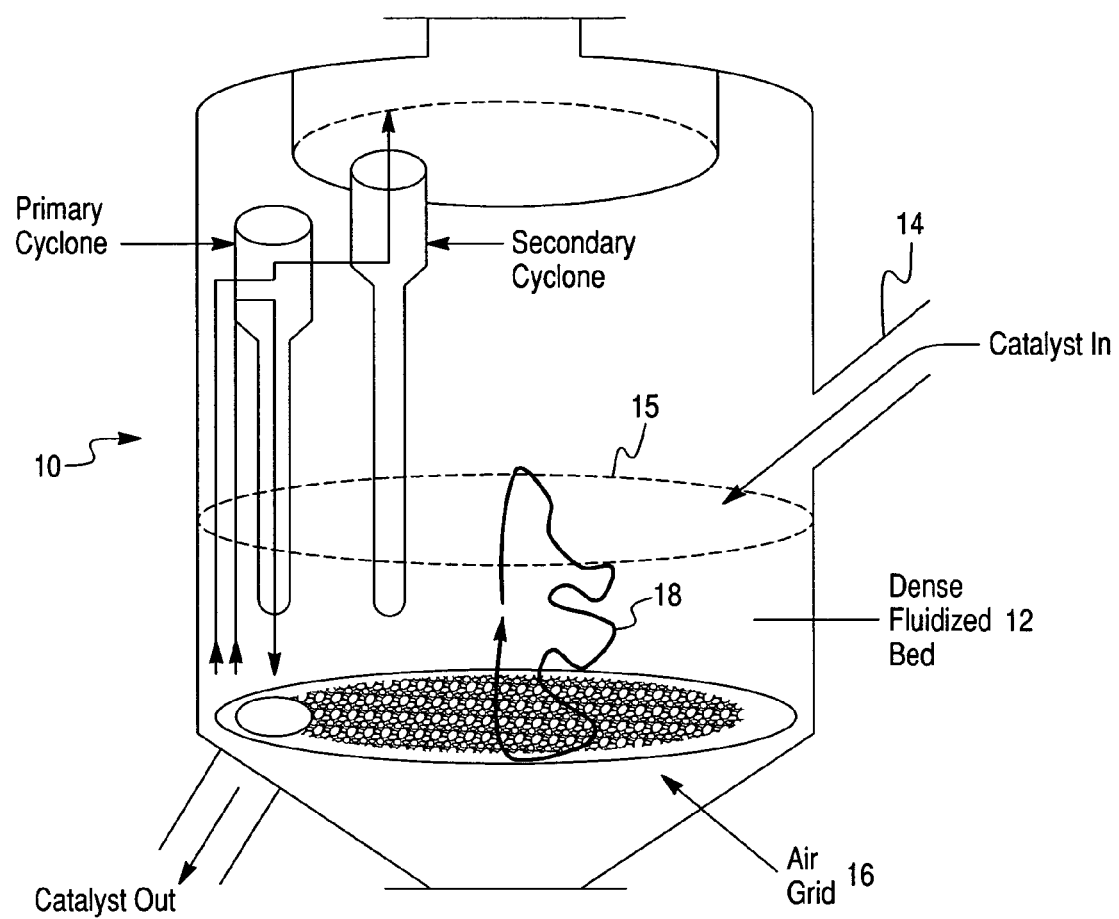
FIG. 1 is a schematic illustration of an FCC regenerator showing the path of a catalyst additive in the dense fluidized bed according to the model of the invention.

The test process and apparatus of this invention seek to emulate the gas compositions experienced by an additive microsphere in an FCC regenerator as the additive circulates around the fluidized bed. Reference to FIG. 1 is useful to an understanding of the model of catalyst flow in the fluid bed of the regenerator, which model helps form the basis of the invention. FIG. 1 is not meant to limit this invention to a specific FCC regenerator design as regenerator designs may vary significantly.

Reference numeral 10 represents an FCC regenerator. In practice, spent coked catalyst is discharged into the regenerator fluidized bed 12, sometimes at the edge of the vessel 10 with tangential entry such as shown by inlet 14, and sometimes towards the center of bed 12 with devices able to disperse the material more evenly over the bed. Generally, air is introduced through a grid 16 near the bottom of the bed 12. The grid 16 supplies oxygen to burn the coke on the catalyst. Typically the regenerator 10 may hold on the order of 300 tons of fluidized catalyst and the bed 12 may be about 10 feet deep. The superficial gas velocity may be about 3 ft/s for a bed in the turbulent fluidization regime. Air entering at the air grid 16 forms large bubbles or even streamlines in the catalyst bed 12. These bubbles or streamlines entrain catalyst as the bubbles rise to the surface 15 of bed 12. It has been found that while the catalyst phase can be well mixed in the vertical direction due to the bubbles and streamlines, the catalyst may not be well mixed in the radial or angular directions, so that compositional gradients may exist at any bed depth in the plane of the top 15 of bed 12.

It is the believed that the catalyst experiences gas phase compositional cycling while traveling up and down within one area of the regenerator. This cycling is shown by arrow 18. Beginning at the air grid 16, catalyst is entrained in an air bubble and transported in about 1-3 seconds to the top 15 of the bed 12 where the atmosphere is rich in combustion products. From there the catalyst drifts down through the dense emulsion phase of bed 12 as the gas phase becomes richer in oxygen. The catalyst eventually returns to the air grid 16 and repeats the cycle. Cycles repeat indefinitely and are not related to the regenerator residence time (inventory/external circulation rate). This internal redox cycling has been ignored in previous test method designs.

Kunii and Levenspiel (Fluidization Engineering, Butterworth-Heineman, 1991) provide the prevailing fluidized bed reactor model. Despite the vigorous mixing that can take place in a fluidized bed and the low conversion that is sometimes found, the gradientless model is not a reasonable reactor model. Instead, the prevailing model holds that the gas in the bed which is in excess of the minimum fluidization velocity travels in bubbles which are in plug flow, and that this constitutes the majority of the flowing gas. The poorer conversion of the fluidized bed as compared to the plug flow fixed bed is explained by limited mass transfer between the gas bubbles, the catalyst in the wake of the bubbles, and the main volume of catalyst in the "emulsion" phase. After construction of the appropriate material balances, they arrive at a first order reactor performance equation which is functionally equivalent to the exponential form of the plug flow reactor, except that the apparent rate constant is not the true kinetic rate constant, but rather a value reduced by the effects of the mass transfer barriers in series. Thus, $$(1-X_{O2})=\exp\{-K_f L_f/u_b\} \qquad (1)$$

where $X_{O2}$ is the oxygen conversion in the bubble, $K_f$ is the effective rate constant for oxygen consumption containing mass transfer effects, $L_f$ is the length of the dense bed and $u_b$ is the bubble rise velocity. The oxygen concentration in the wake or emulsion is lower and linearly related to the bubble concentration, and thus also an exponential form. The effective rate constant may be calculated from the above expression if the conversion of oxygen is known.

The foregoing model can be applied if it is assumed that the catalyst is well mixed in the vertical direction because coke combustion is first order in oxygen. If the oxygen concentration profile is known as a function of bed depth and the stoichiometry of the coke combustion is postulated as in equation (2), then the concentration profiles of the product gases can be determined as well.

$$C_3H_3(coke) + 13/4 O_2 \rightarrow 2CO_2 + CO + 3/2 H_2O \tag{2}$$

$CO_2$, $CO$, and $H_2O$ then also have exponential concentration profiles linearly related to the oxygen profile, but of opposite shape. From the perspective of the catalyst, the initial environment is rich in air at the bottom of the bed 12. This environment quickly transforms to one rich in combustion product gas at the top 15 of the bed 12. If on average the slow downward velocity of the returning catalyst microsphere is constant, then the microsphere sees an exponentially increasing oxygen concentration over time as well as distance. Most of the bed has a gas environment where both oxygen and $CO_2/CO/H_2O$ are present at the same time and place.

In the study of automotive catalytic converters, the air to fuel ratio is recognized as an important parameter (Lox and Engler in Handbook of heterogeneous Catalysis, Vol. 4, pg. 1559). "Lambda" is a normalized and dimensionless air/fuel parameter in common use; lambda=1 represents the stoichiometric mixture. It is well known that the TWC automotive catalytic converter has the most optimal performance at lambda=1. Net fuel-lean conditions (lambda>1) lead to good CO and hydrocarbon conversion but poor conversion of NOx. Net fuel-rich conditions (lambda<1) improves NOx conversion but CO conversion becomes limited due to lack of oxygen. These results are nicely illustrated in air/fuel ratio scans, otherwise known as lambda sweeps, where conversions or concentrations are plotted against lambda values.

More complex interrelationships are found between oxygen, NOx and SOx when these gases are trapped or stored on the catalyst. Synergistic results can be found if engine controls or laboratory conditions are set to have the lambda value oscillate around the value of one (Marin and Hoebink, CATTECH, p. 137, December 1997; Tagliaferri, Koppel and Baiker, Appl. Catal. B: Environmental, Vol. 15, p. 159, 1998).

Automotive catalysts are typically monoliths with active washcoats of precious metals and ceria, and thus not the same as FCC catalysts and additives. For the FCC fluidized bed, the lambda value is $2*[O_2]/[CO]$, neglecting the minor contributions of sulfur and nitrogen species. For the exponential profile expressed as a function of time t where the sum of the dry basis flow rates of the reducing and oxidizing gases is constrained to be constant then, we can calculate $$\lambda(t) = \frac{6.5}{\left[\frac{1}{1 - X_{O2,out}}\right] \exp\left(\frac{T-t}{T}\right) - 1} \tag{3}$$

for the stoichiometry of (2), where $X_{O2,out}$ is the oxygen conversion exiting the dense bed and T is the duration of the catalyst travel time or circulation cycle from the top to the bottom of the dense bed. The total flow rate is maintained constant in order to eliminate changes in fluidization and mass transfer. This then is the exponential top-to-bottom air/fuel ratio experienced by the catalyst as the catalyst circulates inside the fluidized dense bed. Since the catalyst may be in the FCC unit for a month or more and the top-to-bottom circulation time may be of the order of minutes or less, a very large number of lambda cycles are implied under real FCC conditions. It is expected that part of the lambda cycle in the partial burn regenerator will be net reducing. Based on automotive catalyst literature, it is reasonable to expect that the movement between oxidative and reductive environments in the regenerator will have an effect on at least some catalytic materials.

The stated lambda function with time where the net flow rate is constant is the preferred form, although other forms such as [b/(T−t)] or even a linear lambda scan could be used, with or without a constant total flow rate. There are also simplifications in our calculation which might be improved. For example, some of the hydrogen in coke burns faster than the carbon, which will distort the simplified form preferred here. More comprehensive accountings of the lambda profile including fast hydrogen burning and accounting for the ppm gases in the lambda value are within the scope of the invention.

In a full burn regenerator having 1% oxygen in the outlet, the remaining 20% in the original oxygen in air will have been converted, and so the oxygen conversion is about 95%. Having assumed the stoichiometry above however, one half of a mole of $O_2$ had later been consumed by CO oxidation, so the net conversion due to coke burning alone will have been about 82% instead. To simulate a partial burn regenerator we have used an oxygen conversion of 97%. Other values may be chosen as reasonable. The 97% oxygen conversion case is useful in that the first 43% of the cycle time, equivalent to the upper 43% of the fluidized bed, is net fuel-rich or net reducing (lambda<1). The latter 57% of the lambda cycle, equivalent to the lower 57% of the fluidized bed, is net fuel-lean or net oxidizing (lambda>1). Thus reducing and oxidizing conditions are similarly time-weighted in the bubble concentration profile, so the experimental results will contain performance information on both full and partial burn. The model also shows that much of the bed has a net oxidizing gas phase, even in partial burn.

The true efficiency of mass transfer from the bubbles to the main catalyst in the emulsion is limited and so while the oxygen bubble concentration profile may be well known, the catalyst in the emulsion will experience lambda values lower than the bubbles at any given height in the regenerator. Thus we prefer to use higher oxygen conversion values even for full burn testing, in order to assess the performance of a catalyst during rich excursions in oxygen-poor areas that probably exist in the bed. For regenerators with poor spent catalyst or air distribution, this becomes increasingly important. These types of units are also the ones that emit the highest levels of NOx. Full burn units with better bubble-emulsion mass transfer and/or spent catalyst distribution may well be simulated better with $X_{O2}$<82% however.

Nearly all of our work has been done at the most preferred 97% oxygen conversion. Nevertheless, systematic variation of the oxygen conversion will yield interesting results and is within the scope of the invention.

A 3 minute lambda cycle time can be used, although cycle times anywhere within the range of 1-30 minutes may also be useful. Although the cycle time should have no impact on the results if one is operating at a pseudo steady state, accumulation terms in the material balances can come into play in the conversion and selectivity results. This is the basis for the well known oxygen storage function in TWC automotive catalysts, and more recently, FCC NOx additives. Stored oxygen serves to convert CO and perhaps $NH_3$ or HCN during lambda<1, and oxygen vacancies may convert NOx to $N_2$ during lambda>1. As noted above, oscillations in the TWC gas phase lambda value can sometimes improve the results over steady state conditions. These factors make the value of the lambda cycle time quite important in practice.

Figure 17:
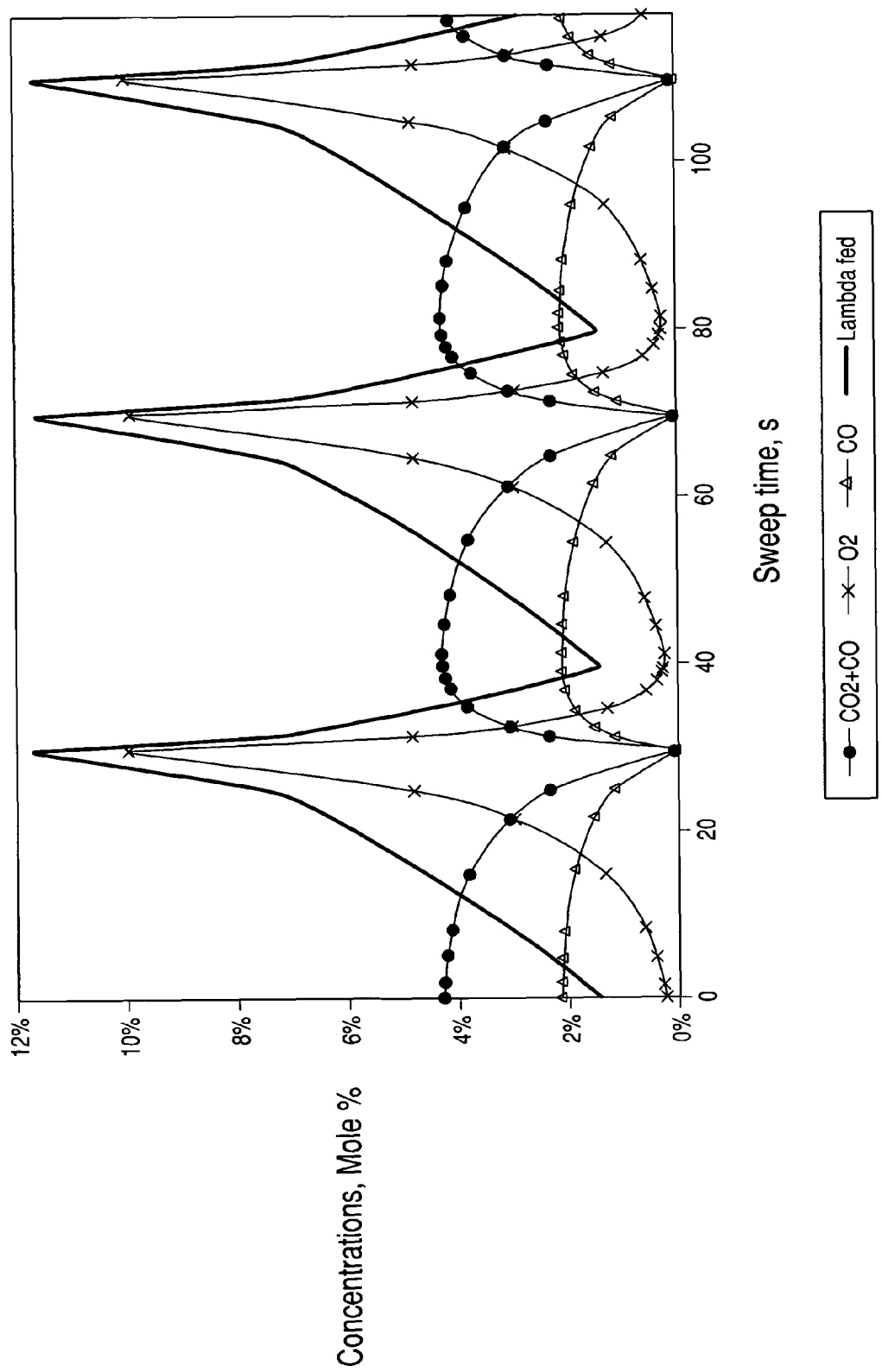
FIG. 17 is a plot of gas concentrations measured during a lambda sweep test simulating a 10 s upflow and 30 s downflow of a catalyst particle in the dense phase of a regenerator.

It has now been estimated that in the regenerator the catalyst rises at 3.1 m/s and falls at 0.9 m/s, using a 5 cm bubble size and a typical superficial gas velocity of 3 ft/s. This results in lambda cycle times of 1 second for the upflow and 3 seconds for the traditional downflow. Accordingly, a 3 minute cycle time or higher corresponds to an extremely low superficial gas velocity. Thus, a much shorter lambda cycle time than suggested above may be used in accordance with the present invention. Lambda cycle times of 1 or 3 seconds may not be feasible with a typical feed apparatus or gas analyzer, since the response times of such apparatus may be much longer than these values. It is useful, then to keep the ratio (upflow/downflow) of the times similar but use longer times. For example, a cycle of 20 seconds for upflow and 60 seconds for downflow is suitable for testing. After adjustments of the testing apparatus, a lambda cycle value of 10 seconds upflow and 30 seconds downflow may also be achieved as illustrated in FIG. 17. However, mass flow controllers and analyzing equipment are now available to allow experiments with response times of a few hundred milliseconds. Accordingly it is within the scope of this invention to have cycle times as low as 0.1 second.

The main concern relative to long lambda cycle times is the measurement of accumulated species on the catalyst during the sweep experiment. SOx and oxygen stored on the catalysts are the main examples. For a given GHSV, a longer cycle time requires more adsorption capacity to have a material impact on the sweep results. Using the shorter cycle times, much smaller levels of oxygen storage can potentially have an impact on the results (rich CO, $NH_3$ and HCN oxidation) whereas the same storage amount could be negligible at longer cycle times. In particular, there may not be enough oxygen storage in E-cat NOx additive or SOx capacity in E-cat SOx additive to affect the rich part of the cycle for a 3 minute cycle time, but there may still be enough to substantially affect a 3 second cycle time. This can affect conclusions drawn using the test.

A plurality of lambda cycles are used to improve the quality of information gained. In general, at least three lambda cycles are performed, with at least ten lambda cycles particularly useful. At least fifteen lambda cycles and more are exemplified in this invention. Although it is preferred to maintain the same concentration profile of oxidizing gases to reducing gases in each cycle, some variations in the oxidization/reduction profile from cycle to cycle is within the scope of this invention.

Both fixed beds and fluidized beds can be used with the lambda sweep test methodology, but the fluid bed is preferred. Although it is not reasonable to employ the superficial velocities of the refinery at the bench scale, the fluid bed can at least begin to approximate the dynamic interactions between gas bubble and catalyst bed. Additionally, the fluid bed model says that increasing the gas velocity will simply make mass transfer more limiting, and this has been entertained by running at higher oxygen conversions in the test. On the other hand, the GHSV of the regenerator can be approximated in the laboratory, using lower gas velocities. Higher than normal doses of additive may be required using the fixed bed, in order to avoid excessive pressure drop over the bed. Pressure drop is not an issue using the fluid bed however, so that normal additive doses may be used. This is advantageous in that equilibrium catalysts may be tested.

Regenerators operate in the neighborhood of 1300° F., well above the auto-ignition temperature of CO. Thus percent-level concentrations of CO with $O_2$ will spontaneously burn in the reactor unless measures are taken to prevent this. CO afterburning in the regenerator dilute phase is well known but it is not often appreciated that the lack of homogeneous combustion in the dense bed indicates that FCC catalyst quenches combustion reactions. Indeed, solids, in general, quench homogeneous combustion, so a CO combustion promoter is needed inside the dense bed to induce catalytic oxidation. The afterburning of CO in the laboratory obviously changes the CO concentration, complicating the assessment of CO conversion activity. We have found that the afterburning also leads to the highly selective conversion of $NH_3$—HCN—NOx in $CO/O_2$ to $N_2$. While this is a favorable thing in the refinery, it is an undesirable artifact in the laboratory since it may lead to incorrect conclusions on catalytic performance.

Secondary homogeneous combustion after the catalyst bed can be avoided by minimizing the residence time of gases at temperatures above about 1100° F. or by inserting flame arrestors. Alternatively, the catalyst bed can be positioned with a 3-zone clamshell heater such that the exit of the dense bed is at the seam between two of the upper two heated zones. A wider disengagement zone is not employed at the top of the reactor. If the uppermost, post-bed furnace zone is operated at less than 1000° F., preferably at 800° F., the combustion reactions are mostly suppressed. Homogeneous combustion reactions may also occur on the feed side of the catalyst bed, where the gas is being pre-heated before contacting the catalyst.

Figure 2:
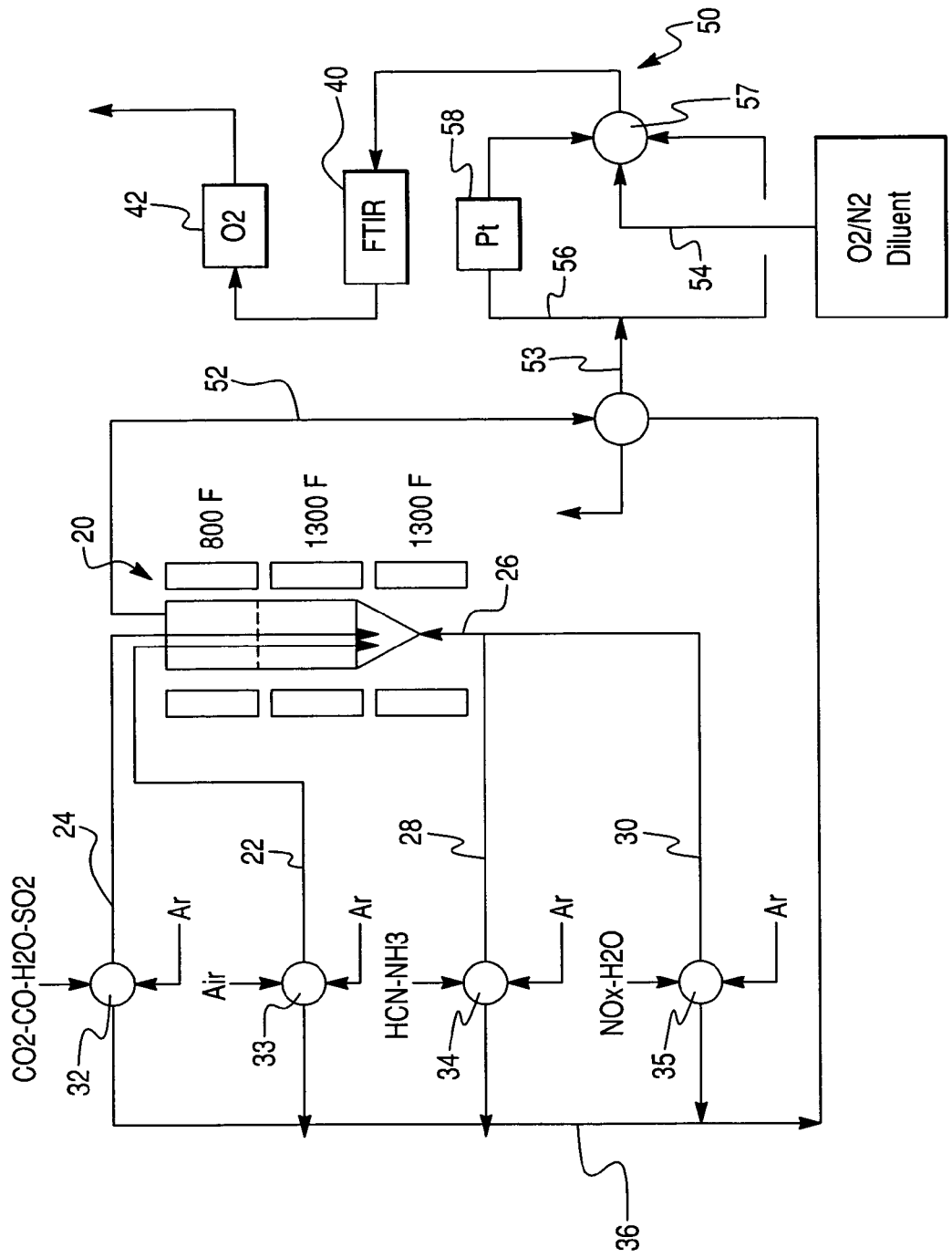
FIG. 2 is a schematic of the testing apparatus used to perform the lambda sweep test of the invention.

It is essential that the reactor parts do not interact with the gases fed, and glass parts are most suitable. Steel parts for example may sulfide or store oxygen. A schematic illustration of the testing apparatus is shown in FIG. 2. Referring to FIG. 2, for the fluidized bed reactor 20 a glass tube-in-a-tube gas injector design can be used one particular embodiment of a tube-in-a-tube design being described in U.S. Pat. No. 6,069,012 to John C. Kayser. At the top of the reactor 20 air flow via line 22 is directed into the center tube and $CO_2/CO/SO_2/H_2O$ flow via line 24 is directed into the annular space between the tubes (not shown). The gas injectors are inserted into the fluidized bed, preferably for injection into the bottom of the fluidized bed, so as to prevent reaction between the gas mixtures before entering the bed 20. As shown, the bottom of the reactor 20 is conical with a small bore opening instead of a glass frit. Via a tube (not shown) in the bottom of reactor 20, a flow of fluidizing gas ($N_2$ or Ar) via line 26 and containing HCN, $NH_3$, NOx and $H_2O$ via lines 28 and 30 is provided. Four port switching valves 32, 33, 34 and 35 allow the reactants to pass through a heated bypass line 36 and direct argon into reactor 20. The air, $CO_2/CO/H_2O/SO_2$ mixture, and the $HCN/NH_3/NOx/H_2O$ injection points are positioned closely together, preferably within about 1 cm of each other, so that the gases are allowed to mix under cover of the fluidized bed. Tests run with laboratory steamed FCC catalyst without metals and promoters have shown an averaged $CO_2/CO$ in the range of 1.5-2.0 for lambda>1 when a 1:1 $CO_2$:CO mixture is fed to the reactor and the exit zone is maintained at 800° F. Tests with CO promoters on the other hand show that $CO_2/CO>100$ can easily be achieved, so that the gas mixing and mass transfer is sufficient for essentially complete combustion within the catalyst bed.

Another advantage of the lambda cycling is that exotherms due to the heat of combustion are moderated, since the mixture is only near lambda=1 for a portion of the cycle time.

If a fixed bed is used, the same injector system can be used but the injectors instead are positioned close to the top of the bed. Three separate gas mixtures then blend just above the catalyst. Tests with blanks and CO promoters have given similar results to those of the fluid bed, suggesting homogeneous combustion is suppressed but mixing is good enough to allow for complete catalytic oxidation of the CO in the feed.

For the fixed bed, for example, a nominal 2 grams charge with 20% NOx additive dosing in FCC catalyst gives about 107,000 $hr^{-1}$ GHSV with respect to the additive at 260 STPCC/min dry basis gas flow rate. For the fluidized bed, 20 grams of catalyst charge with a nominal dosing of 2% NOx additive in the mixture, gives the same GHSV with respect to the additive as in the fixed bed case. Equilibrium catalysts are tested as is in the 20 g fluid bed. CO promoters such as platinum are much more active and should be tested at much lower doses. To be truly faithful to the concept of scanning through the gas compositions as a function of bed depth, operation at a higher space velocity and in the differential conversion range would be preferred. Operation in the integral reactor mode using a full catalyst charge, however, maximizes the likelihood of finding positive leads during catalyst screening and maximizes the visibility of accumulation of oxygen and sulfur on the catalyst, and ensures that $NO_x$ precursor oxidation is studied in the presence of very strong CO and $O_2$ gradients in the fluid bed. The last two aspects can be expected to influence $NO_x$ results. Equilibrium catalyst from fully CO— promoted FCC units have shown integrated $CO_2$/CO for lambda>1 of 10-20, coincidentally similar to the value one would calculate for the gas exiting the dense bed but before afterburning.

Some aspects of the test method employed are well known in standard engineering practice. The gas feed system is based on computer-controlled mass flow controllers where the flow rates of the individual gases are determined by the lambda sweep reactor model discussed above (3). To ensure safety, the CO concentration is generally limited to less than 2% in the reactor at lambda=1.0. The other gas concentrations generally follow from this and the stipulation that the total dry basis gas flow rate to the reactor is held constant. For example, a 20% $CO_2$/20% CO mixture containing about 2700 ppm $SO_2$ in one gas tank can be employed. Compositions containing up to about 45% $CO_2$ and with other $CO_2$/CO and $SO_2$/($CO_2$+CO) ratios are also useful. Other individual gas tanks may contain about 2000 ppm of HCN or $NH_3$ or NOx in an Ar diluent. Air is generally used as the oxidizer.

The rate of coke combustion is proportional to the oxygen concentration, so that the maximum rate of evolution of combustion products, including HCN+$NH_3$+NOx, is at or near the air grid. This suggests that one inject the HCN—$NH_3$—NOx into the lambda sweep test at a rate proportional to the oxygen injection. On the other hand, the accumulated concentration of these nitrogen compounds will be proportional to $CO_2$+CO, absent secondary reactions, suggesting that these gases be injected at a rate proportional to the $CO_2$+CO. The drawback of the first approach is that if a catalyst is bad at lambda>1 and good at lambda<1, one may not recognize this due to the low concentration of nitrogen species fed at lambda<1. Such a catalyst may still work in the regenerator since problems created in the lower part of the bed might be corrected in the upper part of the bed. A similar argument can be made for the case where nitrogen species are fed at a rate proportional to the $CO_2$+CO, so it is not clear that either method is more useful than the other. Either method can be practiced. However, the divergent interests can be reconciled by feeding the nitrogen species at a constant rate and concentration to the reactor. Assessment of activity at any individual lambda value (bed depth in the regenerator) is then straightforward.

Steam is an essential component to emulate the regenerator gas chemistry. While other methods may be employed, the use of commercially available gas humidifiers made from Nafion tubing is preferred in order to add steam to the reactor as shown in FIG. 2. When appropriately specified, these membranes provide a close approach to equilibrium steam partial pressure in the flowing gas. Liquid water is on the other side of the membrane at a controlled temperature, +/−0.40° F. This method is most useful when low steam concentrations are added to gas streams injected at varying rates. These membranes also prevent the loss of combustion gases; $SO_2$, NOx and $CO_2$, into the liquid water and allow the steam to be fed reliably to the reactor. Saturators will absorb these gases.

Steam may be present in amounts up to about 15% in the regenerator effluent, although the hydrogen in coke accounts for only about half of the steam. The extra steam comes from stripping steam and ambient humidity in the air. For this reason steam is added to the $CO_2$/CO feed mixture (line 24, FIG. 2) in about a 3C:3H ratio, as indicated by stoichiometry (2), and the remaining steam is added at a constant rate to the NOx in the bottom fluidizing gas (line 30, FIG. 2). $NH_3$ and HCN are added by a separate line 28 to prevent damage to the Nafion tubing.

Mixtures of $NH_3$ with $CO_2$, NOx and SOx in a combustion environment run the risk of condensing out solid ammonium salts once the temperature drops below the dew points of those salts. It is essential that this be prevented because it would represent an artificial loss of pollutants from the reactor product stream. Prevention is accomplished by heat tracing all of the tubing in the reactor system where condensation is a possibility, and running these heaters at or above about 450° F., preferably 500° F. Employing this temperature will also ensure a fast response from water and $NH_3$. Exit filters are best constructed of glass and heat traced to prevent adsorption and catalytic reactions on the filter.

Referring again to FIG. 2, gas analysis can be accomplished by any known means. FTIR gas analyzers 40 and mass spectrometers are most useful for analyzing transient gas compositions. The process gas requires dilution before analysis but these analyzers commonly have adequate detection limits. Mass spectrometric analysis of combustion gases is difficult however, particularly for determination of $N_2$ and $NH_3$. FTIR gas analyzers with a gas cell capable of operating at 450° F. or higher, coupled with an oxygen analyzer 42 are preferred. These types of analyzers however are unable to measure $N_2$, $H_2$ and $H_2S$, and calibrations may not be available for $SO_3$.

It may be useful to employ a post-reactor catalytic converter 50, which can optionally be employed to help with the gas analysis. $H_2$ may be formed at percent levels by the water-gas shift reaction for example, but $H_2$ cannot be analyzed by FTIR. To overcome this, the reactor flow can be blended via lines 52 and 53 with a diluent of $N_2$ or 0.5% $O_2$ in $N_2$ and the blend via line 56 passed through a Pt oxidation catalyst 58 at 1300° F. The diluent passes first through four port valve 57 via line 54 and can be directed to blend with reactor flow 53 and to catalyst 58 via line 56 or the diluent can be directed via valve 57 to flush catalyst 58 and cause reactor flow from line 53 to bypass catalyst 58. The oxygen in the diluent is sufficient to convert any $H_2$ to $H_2O$ and $H_2S$ to $SO_2$/$SO_3$ with the majority being $SO_2$. The tubing and fittings used to build the reactor 50 should be glass or pretreated with a protective coating such as Sulfinert® SiO$_2$ treatment to prevent adsorption and sulfiding at high temperatures however. NH$_3$ and HCN are also mainly converted to NOx, so use of this type of reactor with plumbing to place the reactor on and off line enables reasonably complete determinations to be made even with a standard CO$_2$—CO—SOx—NOx continuous emission monitor.

Sulfur, nitrogen, oxygen and carbon compounds are fed to the reactor 20 at known rates. Many of the possible product gases are measurable, but some may not be. Sulfur, oxygen and carbon may be retained by the catalyst and, thus, the amounts of these gases are likely to change with lambda and time. Material balances may be constructed that provide a measure of the sum of non-analyzed and accumulated species. A sulfur balance is useful to quantify the uptake of SOx while conditions are at lambda>1 and the released SOx (less H$_2$S) when at lambda<1. If a post reactor oxidation catalyst or mass spectrometer is used, the contribution of H$_2$S can be determined. The sulfur uptake and release capacities and kinetics are important for SOx emissions in the FCC regenerator.

Nitrate and nitride species on the other hand are not expected in the regenerator. Thus a nitrogen balance yields the concentration of N$_2$ in the effluent (if it is not otherwise directly measured), and this is a direct and convenient measure of the quality of a NOx additive or low NOx promoter.

Oxygen and carbon balances may also be constructed. An oxygen balance will yield a measure of the kinetics and capacity of oxygen storage components in the additives, a key function of NOx additives.

The foregoing has been focused on the lambda sweep catalytic performance test. The other aspect of the invention is a process to deactivate catalysts and additives. While the mechanisms of the deactivation of such materials may not be readily understood, providing an environment that closely simulates the actual regenerator can be reasoned to give the most reliable predictions of deactivation in the refinery.

When the lambda sweep concept is used for deactivation, the same concentration profiles are useful. Operation at a higher CO concentration at lambda=1 is expected to make deactivation rates more similar to the FCC unit, but may necessitate providing additional diluent gas just above the dense bed to reduce the consequences of any afterburning. Thus, amounts of CO approximating 35% of the gaseous components have been used. In general, partial pressures are about 10× higher in the deactivation cycle than the catalytic performance tests. A larger catalyst charge will be used, typically 50-200 g, and a correspondingly larger reactor. Gas analysis would not be necessary on a routine basis but heat tracing and glass parts in the heated zone should be used to ensure that the gaseous components reach the catalyst as intended. Higher steam/carbon or sulfur/carbon ratios, or higher temperatures may be speculated to give accelerated deactivation. The cycle time may have an impact on the rate of catalyst deactivation as well. In general, more lambda cycles are run for the deactivation tests than for the catalytic performance tests. At least twenty lambda cycles are useful with at least eighty lambda cycles and more particularly useful.

EXAMPLES

The fluid bed performance testing apparatus as illustrated in FIG. 2 was used. The reactor was a 1" diameter quartz tube with a conical bottom and no frit. A gas manifold supplied separate streams of NO/H$_2$O, NH$_3$, and HCN in diluent Ar that were blended and then sent through the bottom fluidizing tube at nominally 165 STP cc/min. A quartz tube-in-a-tube injector delivered CO$_2$/CO/SO$_2$/H$_2$O and dry air separately to within about 1 cm of the exit of the bottom NO/HCN/NH$_3$ tube. The sum of the CO$_2$/CO/SO$_2$/Ar and the air flow rates were constant at 95 STP cc/min. There were also several sweeper gases of a few cc/min used to keep pressure gauges and other instrumentation clear of condensate and corrosives. 20 g of test catalyst were placed in the reactor and surrounded the feed injection point. The three feed gases mixed under cover of the test catalyst, bubbled up through the bed and exited the reactor through a quartz filter. A three zone heater was wrapped around the reactor with the zone(s) above the top of the fluid bed operated at 800° F. and zone(s) below operated at 1300° F. A bed thermocouple can be used and remains inside the air injector tubing and extends to the end of the injector but not beyond it. Downstream tubing was stainless steel. High temperature GC switching valves and the tubing were heat traced at 450° F. or higher. 2 LPM of N$_2$ or 0.5% O$_2$ in N$_2$ were added as diluent to improve the response time and linearity of an FTIR, also heated to 230°-240° C. Further downstream was a gas drier and oxygen analyzer.

The lambda cycling parameters used were 97% oxygen conversion, 3 minute cycle time, 2% CO/2% CO$_2$/4% H$_2$O at lambda=1, along with about 279 ppm SO$_2$, 389 ppm NO, 391 ppm NH$_3$, and 448 ppm HCN. This set of parameters led to about 7.5% O2 at the end of the cycle and about 2.3% CO and CO$_2$ at the beginning of the cycle. CO concentrations were held low as a safety consideration.

Example 1

Figure 3:
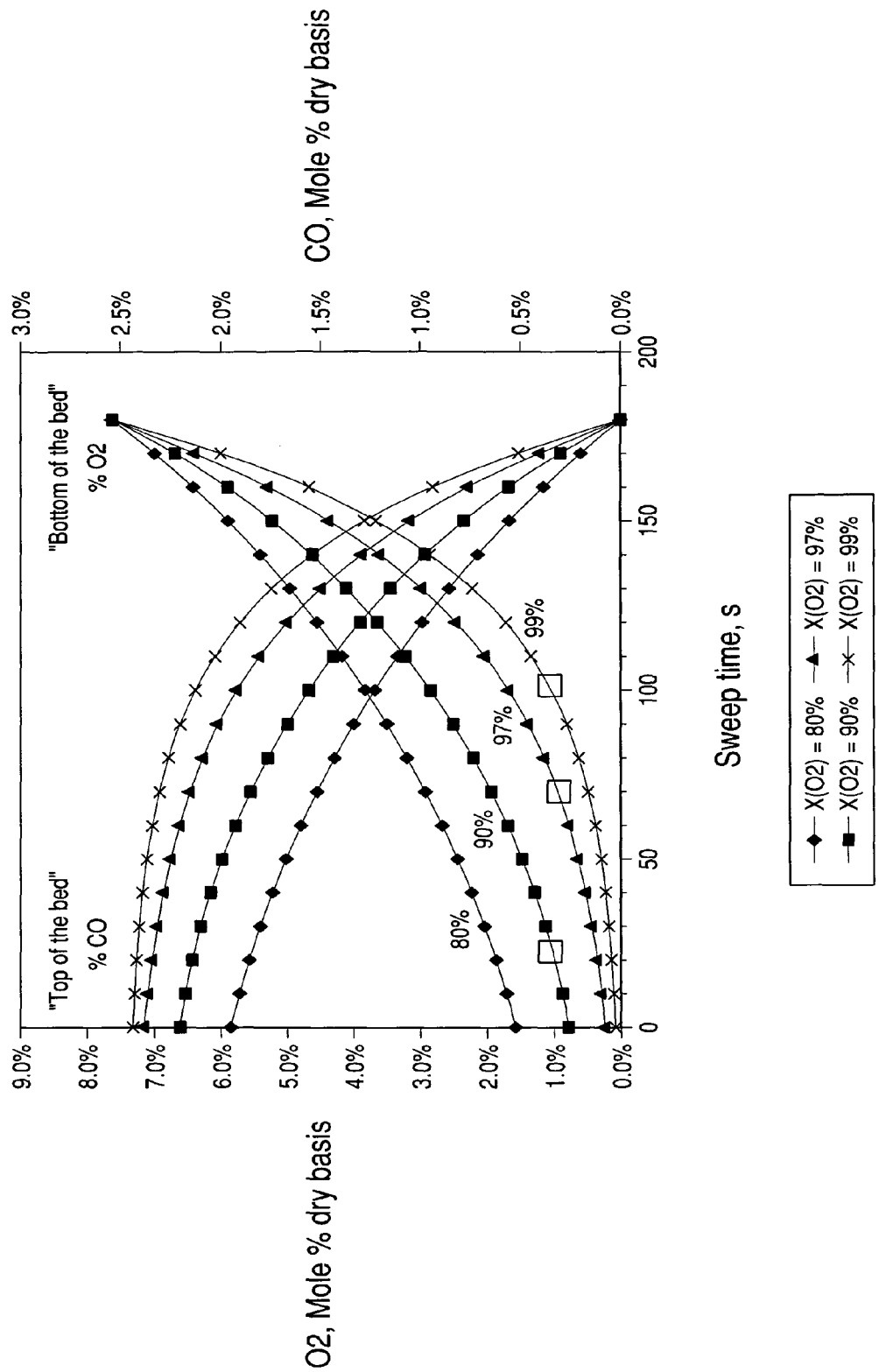
FIG. 3 is a plot of CO and $O_2$ gas concentrations measured during a lambda sweep test simulating various oxygen conversions as described in Example 1.

The concentration curves for a single lambda cycle were calculated with the set of parameters as above, but where the oxygen conversion in coke burning was varied between 80% and 99%. FIG. 3, after rotating 90°, shows that increasing the oxygen conversion parameter in the model led to a faster drop on oxygen concentration with bed depth (end of lambda cycle) and a flatter CO profile at the top of the bed (beginning of lambda cycle). The lambda values changed accordingly with sweep time and bed depth. The times at which the lambda values crossed over 1.0 (rich to lean transition) have been determined and are marked in FIG. 3 as the large open squares on the oxygen curves, the time before the marker being net reducing, and the time after being net oxidizing reactor feed. Translated to the fluidized bed, this means that the point in the bed above which the gas composition becomes net reducing moves higher with decreasing oxygen conversion. For 97% conversion, the gas bubbles in the upper 43% of the bed were net reducing, and the gas bubbles in the lower 57% were net oxidizing. For oxygen conversion at about 87%, the bed exit gas was stoichiometric, and less than that the lambda=1 condition was never reached in the bed, so the regenerator was in full burn. The 80% conversion case corresponded to 0.6% excess oxygen in the experiment.

Given that the oxygen concentration in the model has a gradient in the vertical direction, the concept of an "averaged" regenerator gas composition is not well grounded. Nevertheless, one can calculate the time- (or depth-) averaged lambda value for the gas phase in each case, and all of the net lambda values are greater than one for the cases in FIG. 3. Repeated cycles run on catalysts in these cases will always be overall oxidizing, even for reasonable partial burn modeling.

Example 2

Figure 4:
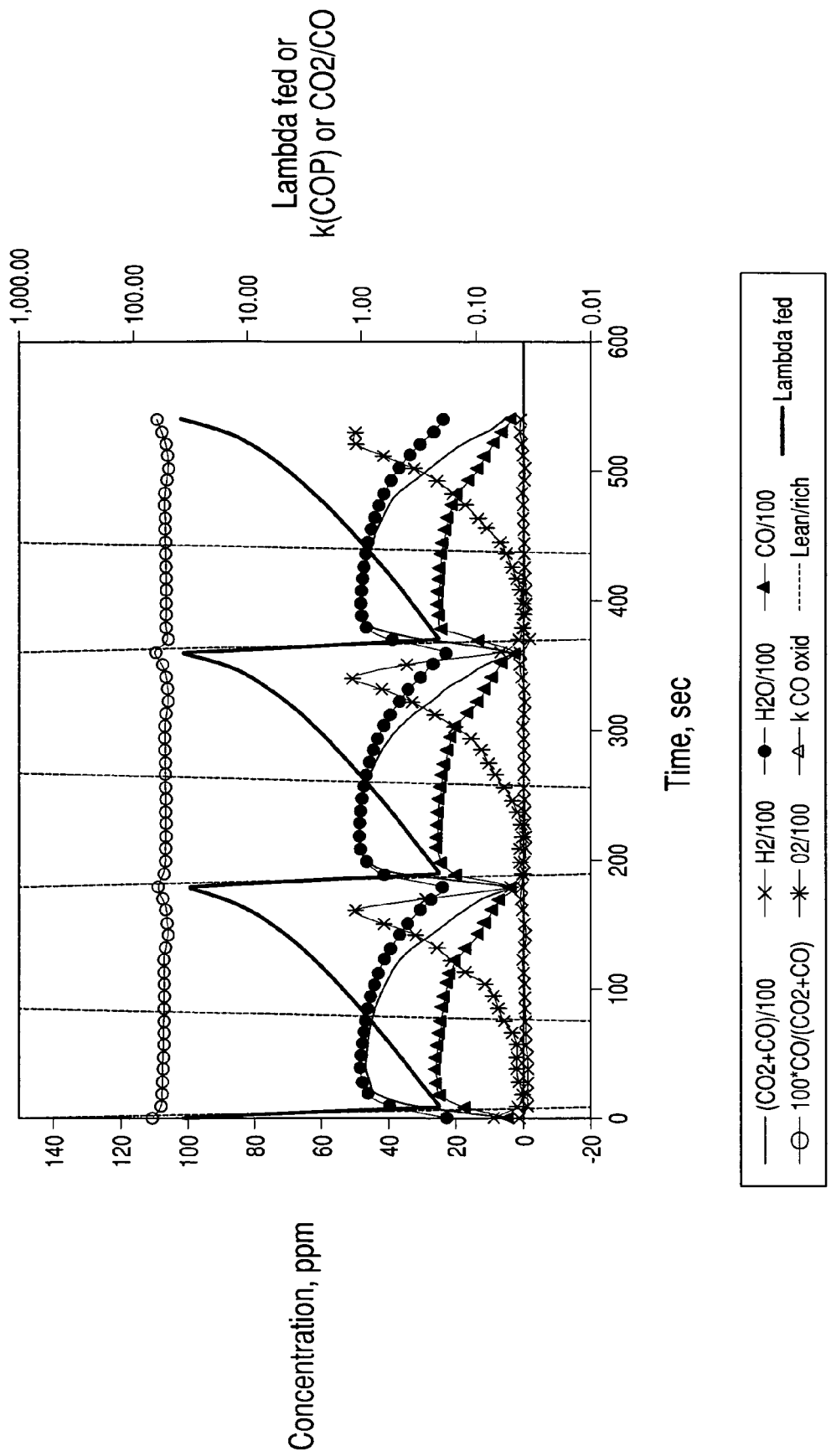
FIG. 4 is a graph of CO, $CO_2$, $H_2$, $H_2O$, and $O_2$ concentrations of a simulated regenerator reactor feed bypassed directly into an analyzer without reaction utilizing a lambda sweep as described in Example 2.

In this example, the measured concentrations for three lambda cycles are shown when the reactor feed was bypassed directly to the analyzer without reaction, FIG. 4. The (CO$_2$+

Figure 5:
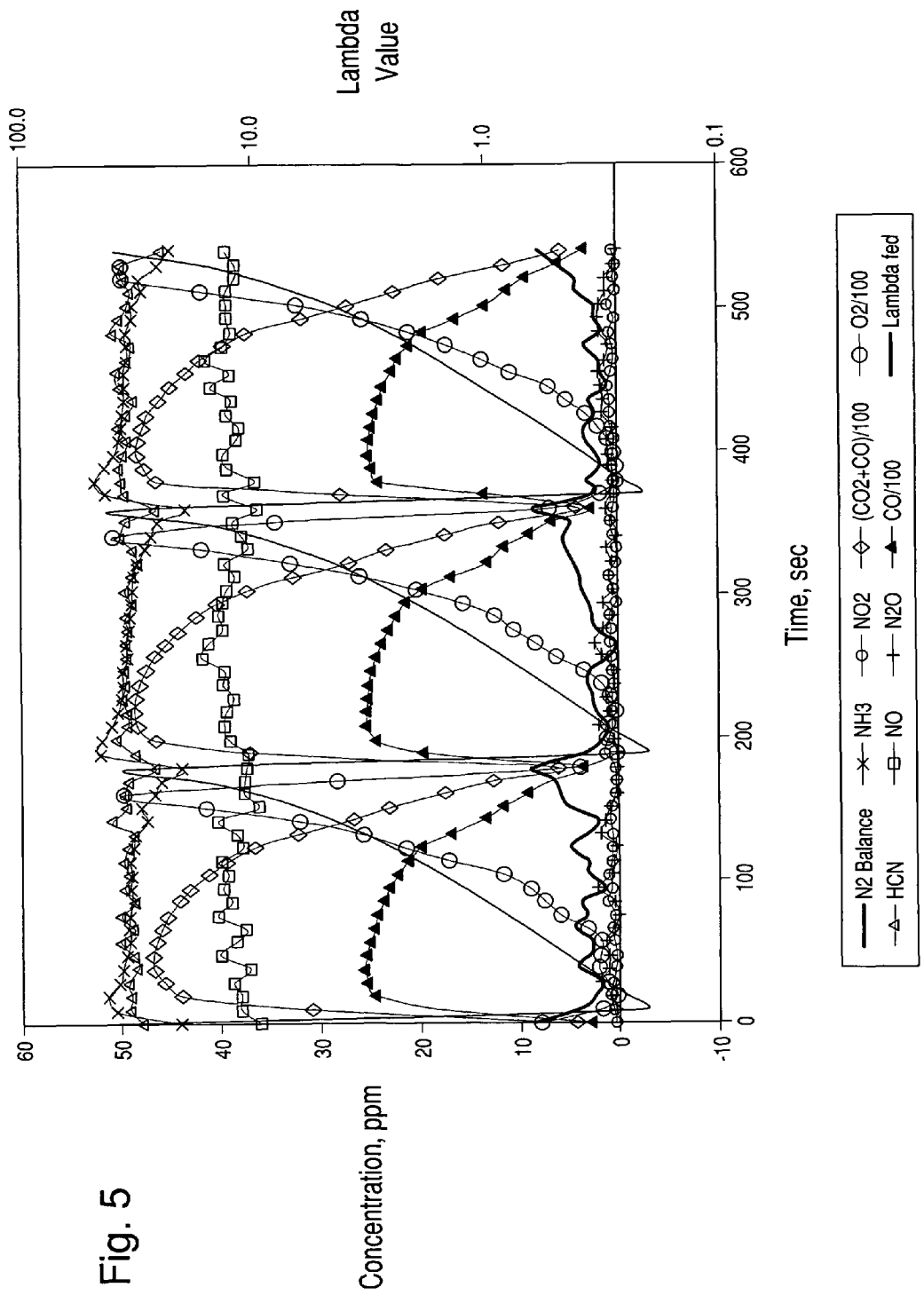
FIG. 5 is a graph of nitrogen species concentrations of a simulated regenerator reactor feed bypassed directly into an analyzer without reaction utilizing a lambda sweep as described in Example 2.
Figure 6:
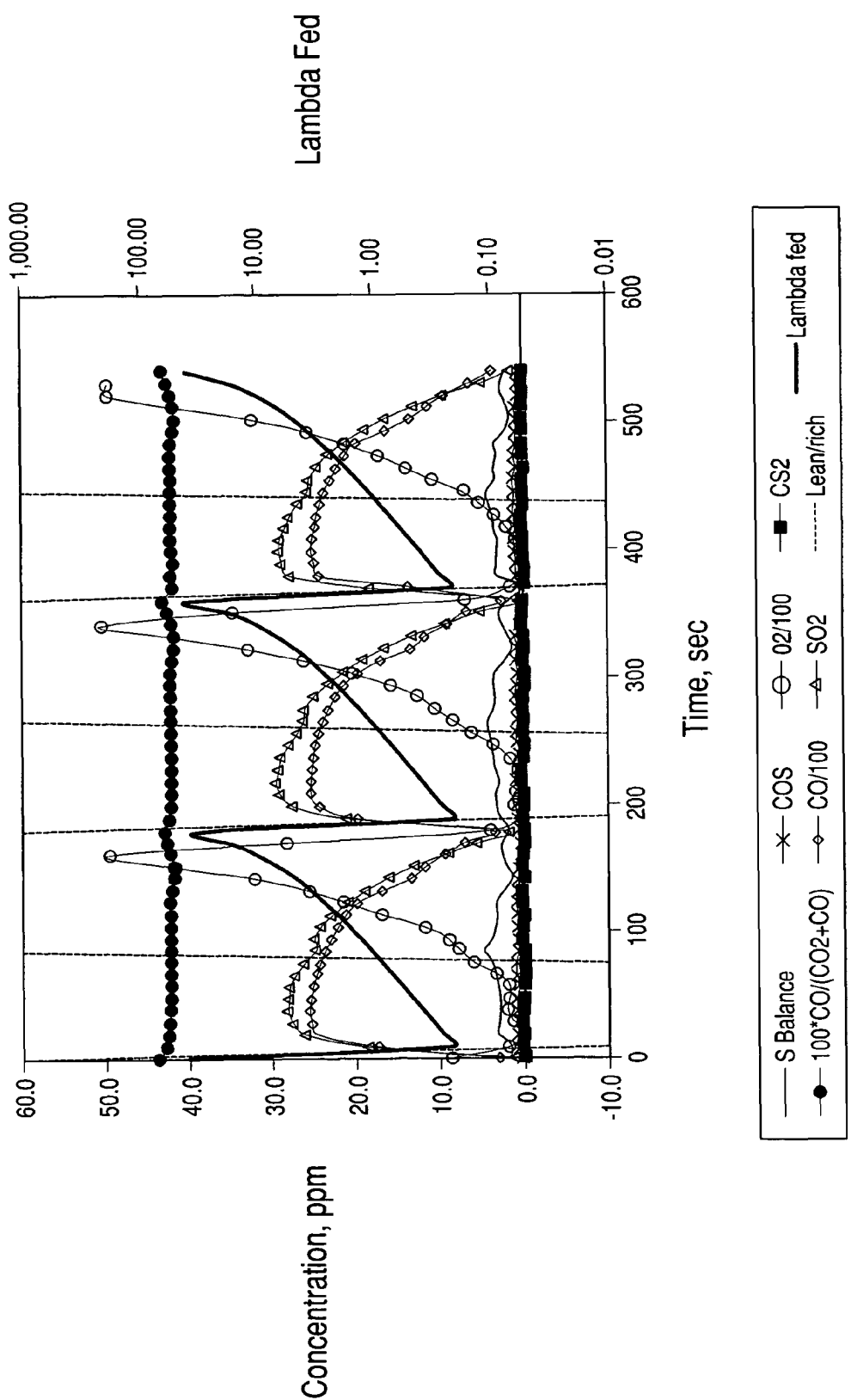
FIG. 6 is a graph of sulfur species concentrations of a simulated regenerator reactor feed bypassed directly into an analyzer without reaction utilizing a lambda sweep as described in Example 2.

CO)/100 and CO/100 curves followed the expected trends with water following the $CO_2$+CO curve. The $O_2$ curve had the opposite shape of the CO curve. A material balance on hydrogen species allowed the estimation of the $H_2$ formed, and the amount was small as expected. Also shown on the logarithmic scale was the lambda value fed to the reactor and this paralleled the feed oxygen. Vertical dashed lines indicate the time where the feed transitioned between rich and lean (lambda <1 or >1). In the nitrogen species plot, FIG. 5, the measured HCN, $NH_3$ and NO were roughly constant with time. Note that these measured concentrations were at (260/2260) dilution so the reactor levels were much higher. A nitrogen species material balance was calculated and the result was about 0-5 ppm $N_2$, indicating the precision of the method. Sulfur species were measured and the material balances are shown in FIG. 6. $SO_2$ followed the CO concentration and the sulfur material balance was good to about 5 ppm.

Example 3

In this Example the lambda sweep protocol was run using an empty fluid bed reactor and the feed composition of Example 2, while varying the temperature of the reactor furnace between 800° and 1400° F. All three zones were at the temperature indicated in FIGS. 7A and 7B. The results for CO and $N_2$ by material balance were plotted for five temperatures together, showing three of the many cycles that were run. The results from cycle to cycle were reproduced well, indicating that a dynamic equilibrium had been reached. For reactor temperatures below 1100° F., the CO concentration remained equal to the feed gas. At 1100° F., homogeneous combustion around lambda=1 converted significant amounts of CO. If steam was excluded, there was no combustion, so steam catalyzed the homogeneous combustion. At 1300° and 1400° F., lean side CO conversion by homogeneous combustion was more than 99%. More interesting than that was the yield of $N_2$ determined by material balance. Little $N_2$ was formed at the lower temperatures without combustion, but as combustion began at 1100° F., a relatively larger amount of $N_2$ was formed from the $NH_3$—HCN—NO in the feed. $NH_3$ and NO are nearly eliminated by combustion; the residual species being largely HCN. The theoretical maximum yield of $N_2$ is about 73 ppm so combustion gave roughly 80% yield of $N_2$. This showed that afterburning occurs readily at regenerator conditions, as is well known, and that the afterburning can have a dramatic effect on the nitrogen species observed downstream. Controlling the afterburn in the laboratory is essential to getting results due solely to the catalysts. However, afterburning may further influence the performance observed in the refinery. These results suggest that the mechanism for obtaining low NOx in the refinery at high CO outlet concentrations may actually be the non-catalytic reaction of $NH_3$ and NO, stimulated by homogeneous combustion of CO.

Example 4

A wide variety of samples were run to illustrate the utility of the invention. The samples were: a steamed FCC catalyst with no additives, the same base catalyst blended with fresh 500 ppm Pt/Al2O3 additive sufficient to reach a $CO_2$/CO ratio (by integration of the lean side data) of 22, steamed 500 ppm Pd on CePr/$Al_2O_3$ additive sufficient for $CO_2$/CO=21, a fresh/steamed mixture of a base metal CO promoter dosed for $CO_2$/CO=22, a fresh/steamed mixture of a FeSbCu partial burn additive ($CO_2$/CO=2), or a steamed CuCePr/$Al_2O_3$ NOx additive blended with sufficient fresh Pt promoter to reach an 18 $CO_2$/CO ratio.

Figure 8A:
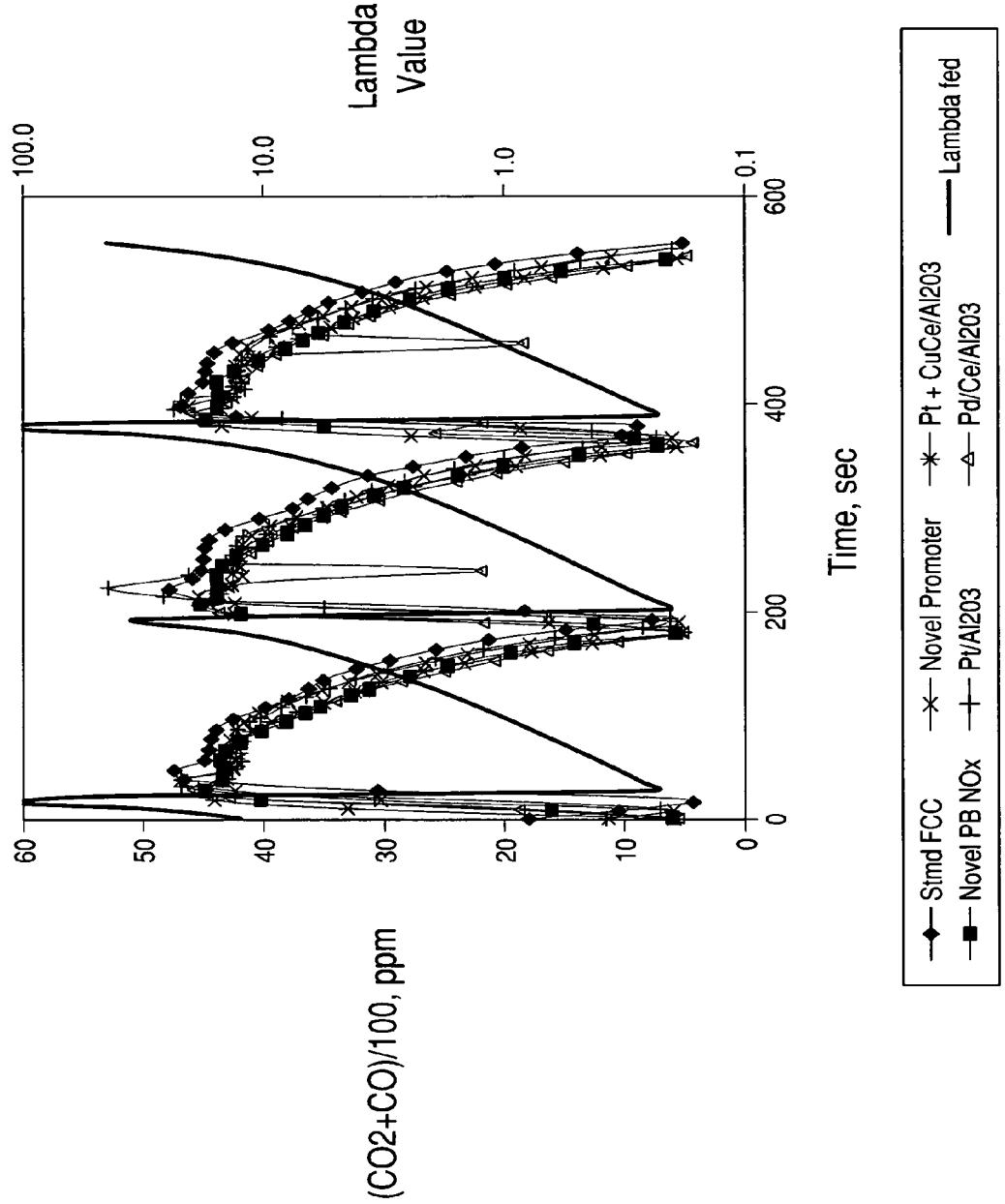
FIGS. 8A and 8B are graphs of $CO_2$+CO and $H_2O$ concentrations, respectively, during lambda sweep testing of various CO oxidation promoters as described in Example 4.
Figure 8B:
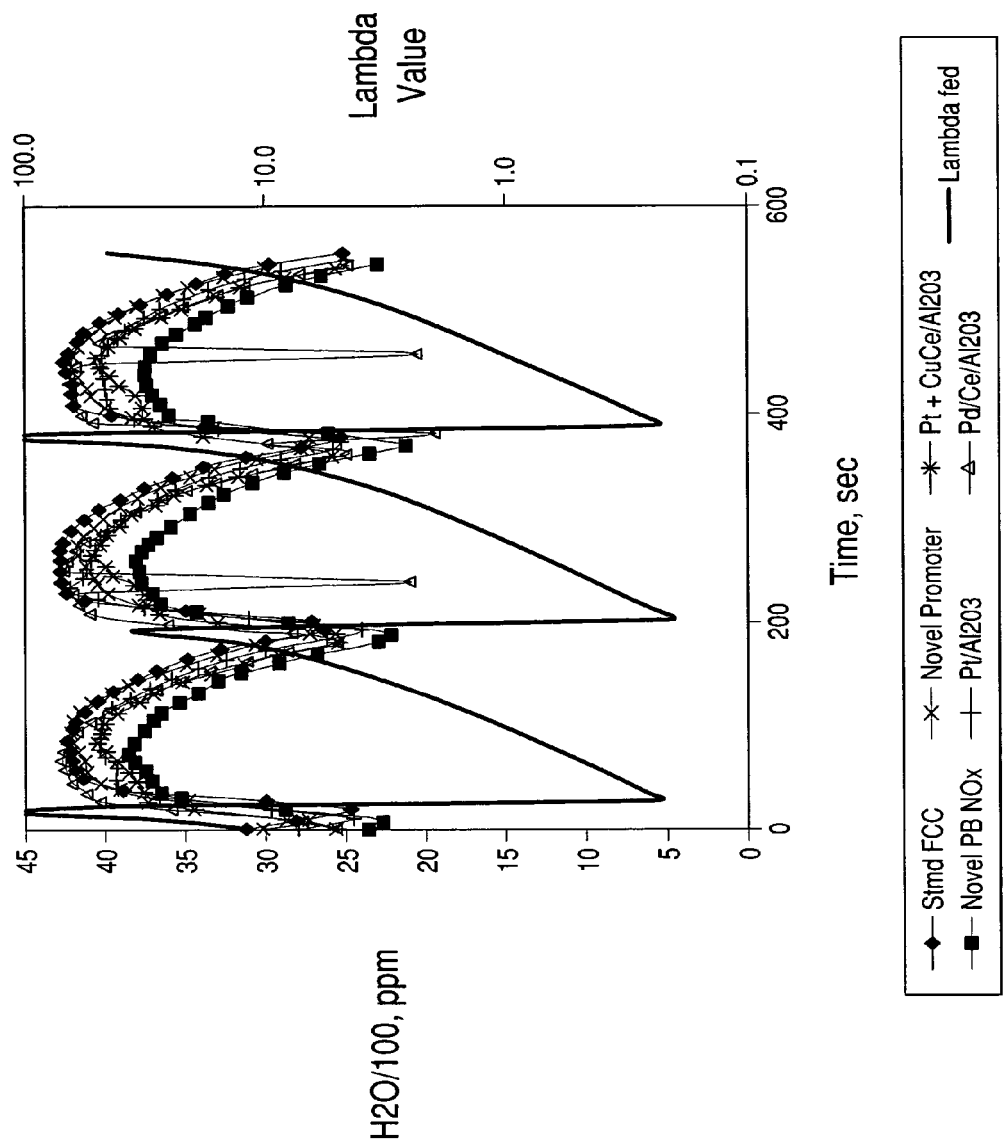
Figure 9A:
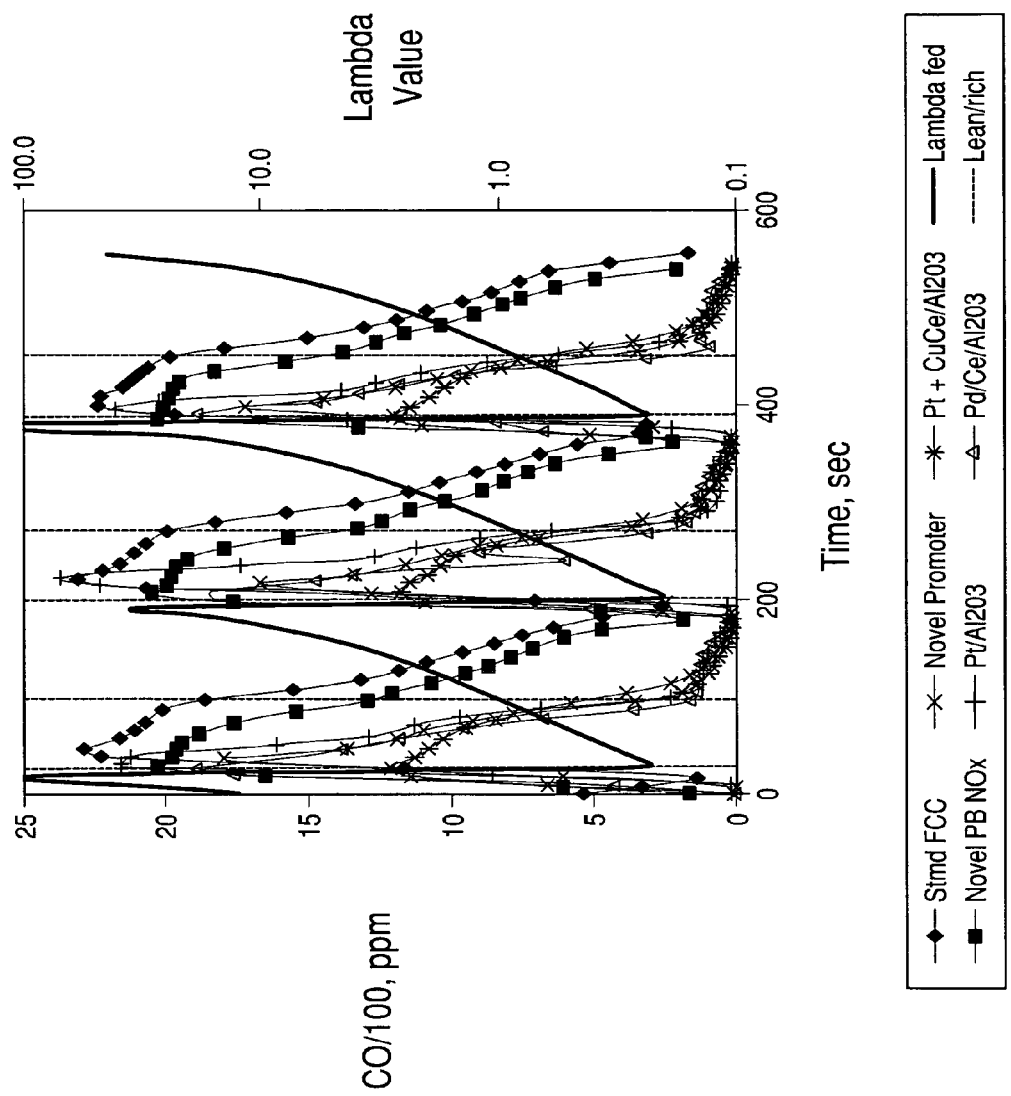

The $CO_2$+CO and $H_2O$ data in FIGS. 8A and 8B show that the feed gas compositions were equivalent for the six runs. The CO ppm plots in FIGS. 9A and 9B show that on the rich side there was significant CO consumption for the combination of Pt with the NOx additive, due to stored oxygen from the lean part of the previous cycle. This mimicked the sudden movement of the catalyst from the air grid into a rich region at the top of the regenerator. The log CO plot shows that typically more than 90% of the CO was oxidized on the lean side and that the promoter cases were similar in CO conversion activity. The partial burn additive did not convert CO, however.

The next plots of NOx and $N_2$, FIGS. 10A and 10B, show that the Pt and Pd promoters made NOx on the lean side, but that the rare earth additions improved the results somewhat at equivalent $CO_2$/CO. The base metal promoter made much lower NOx at equivalent $CO_2$/CO and the FeSbCu partial burn additive or control catalyst (and perhaps a small amount of afterburn) removed nearly all of the NOx fed. The nitrogen balance shows the lean production of NOx led to a deficit in lean $N_2$, and that all the promoters made significant $N_2$ on the rich side (top of the bed). The FeSbCu partial burn additive was unique in that it yielded $N_2$ independently of lambda; the selectivity to $N_2$ was about 95% in this test.

Figure 11A:
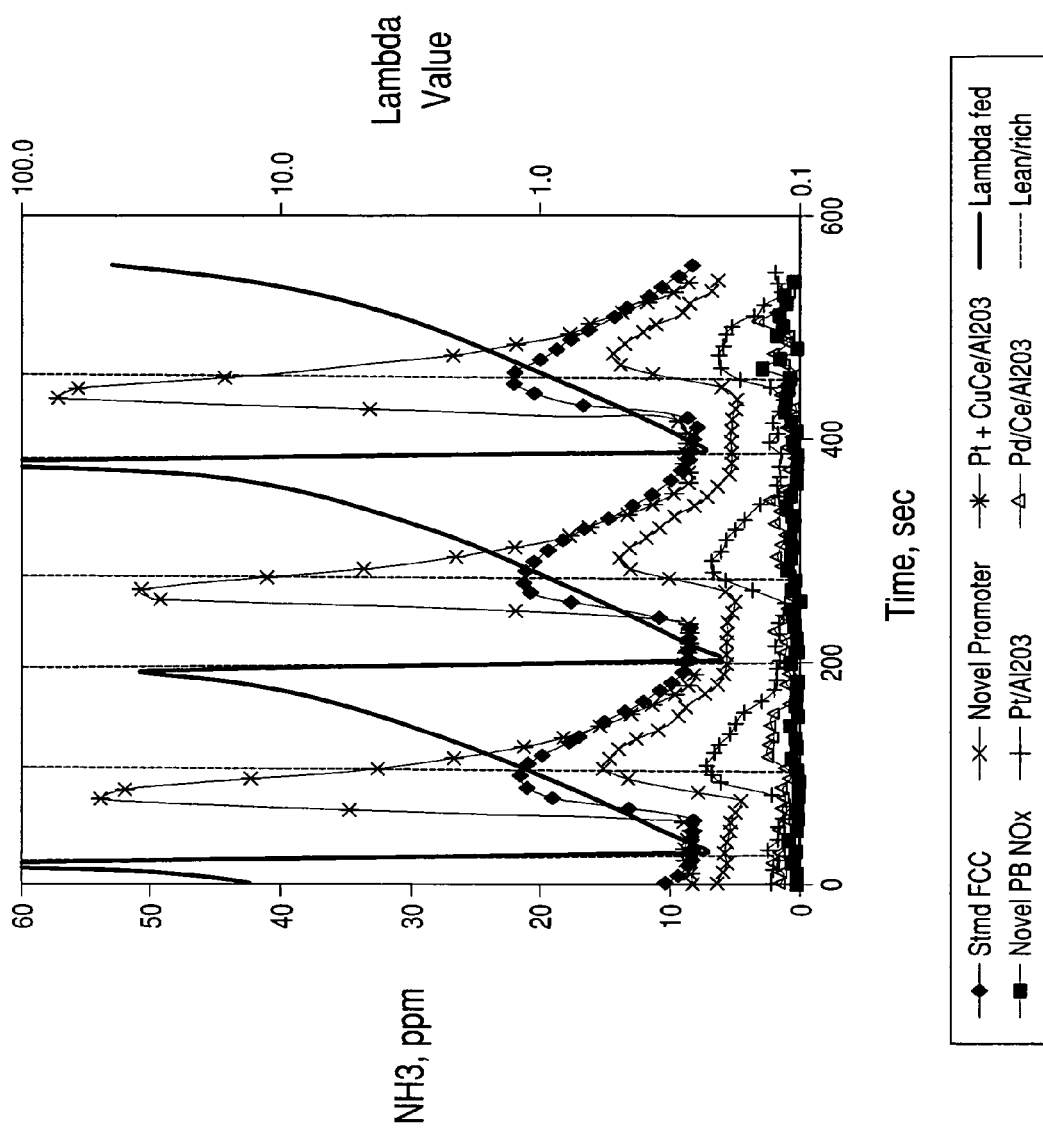
FIGS. 11A and 11B are graphs of $NH_3$ and HCN, respectively, found during lambda sweep testing of various CO oxidation promoters as described in Example 4.
Figure 11B:
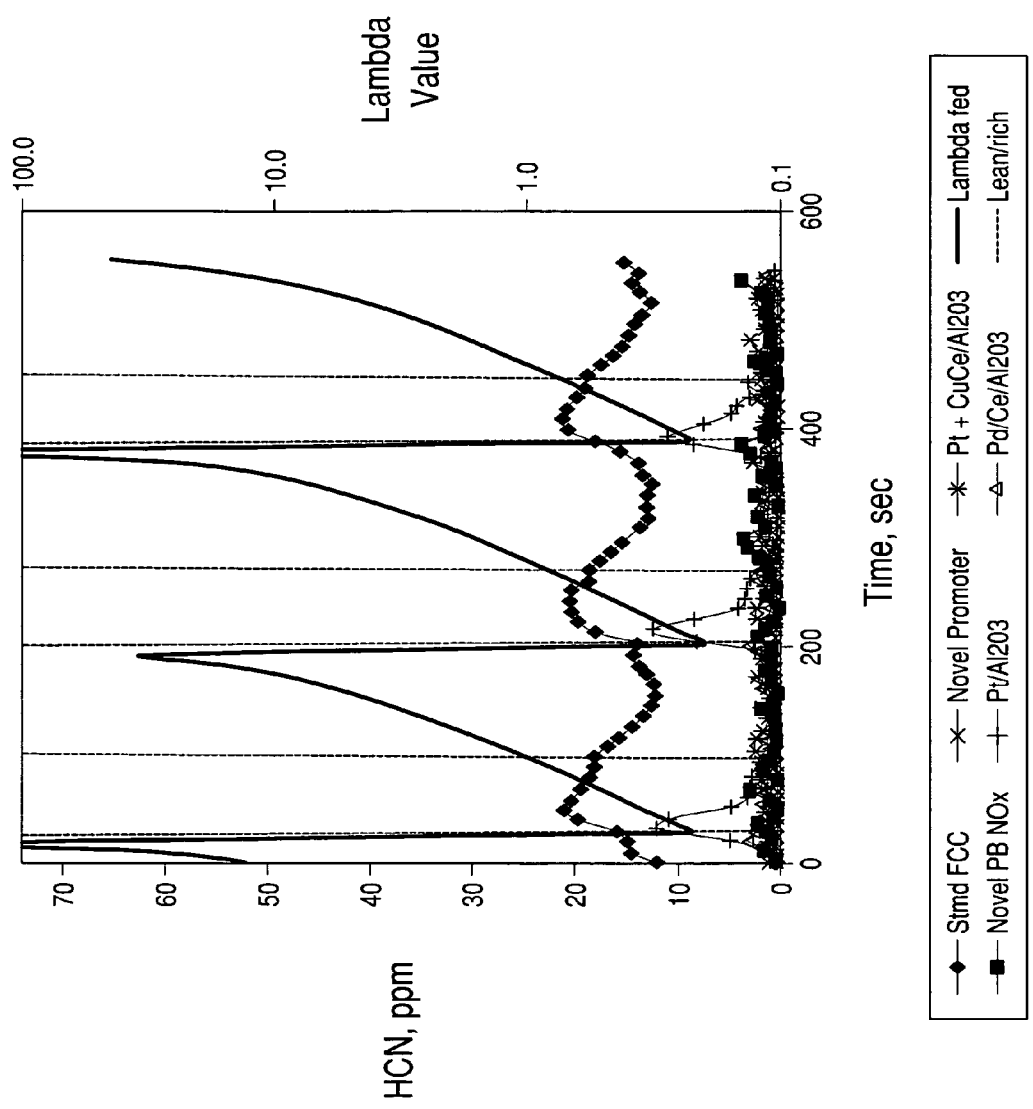
Figure 12A:
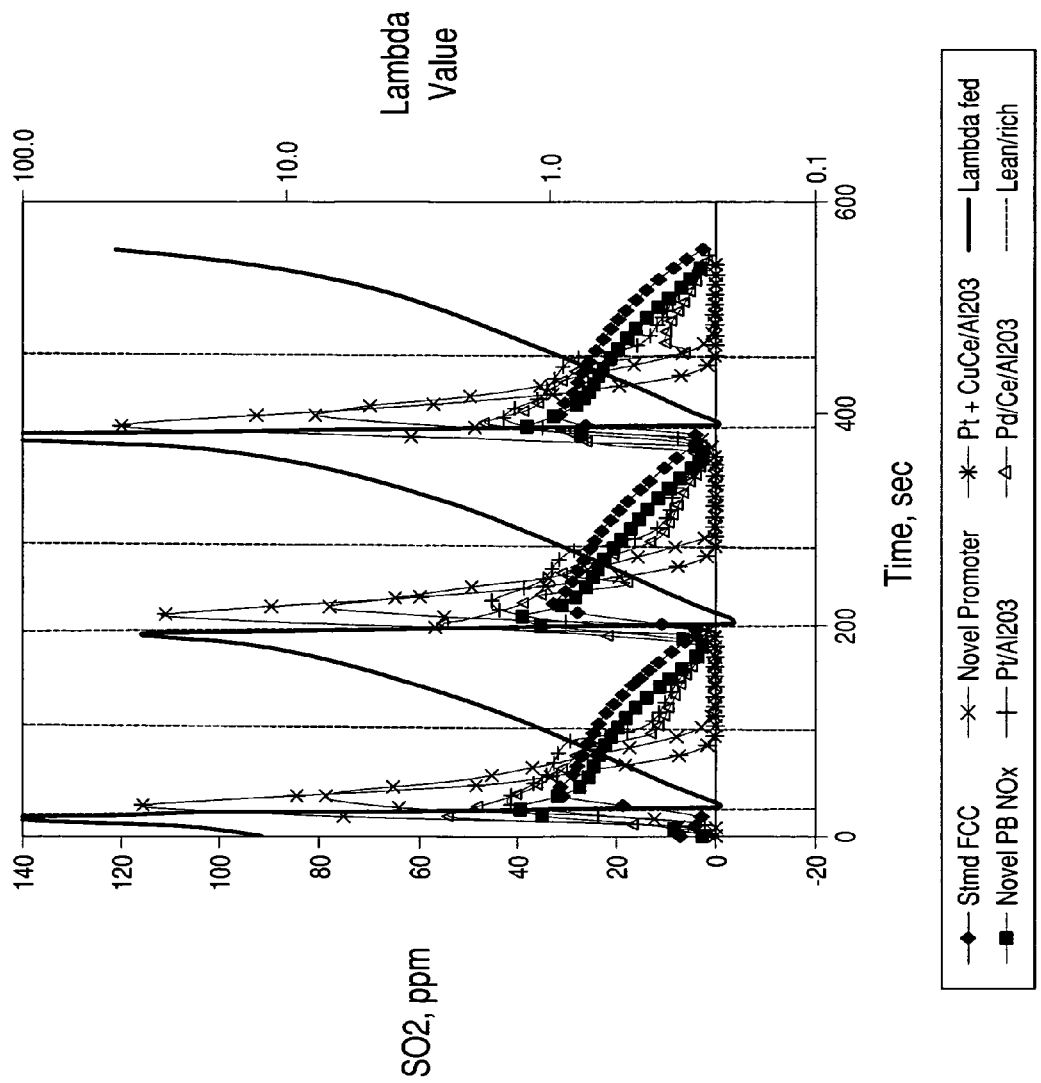
FIGS. 12A and 12B are graphs of sulfur species, found during lambda sweep testing of various CO oxidation promoters as described in Example 4.
Figure 12B:
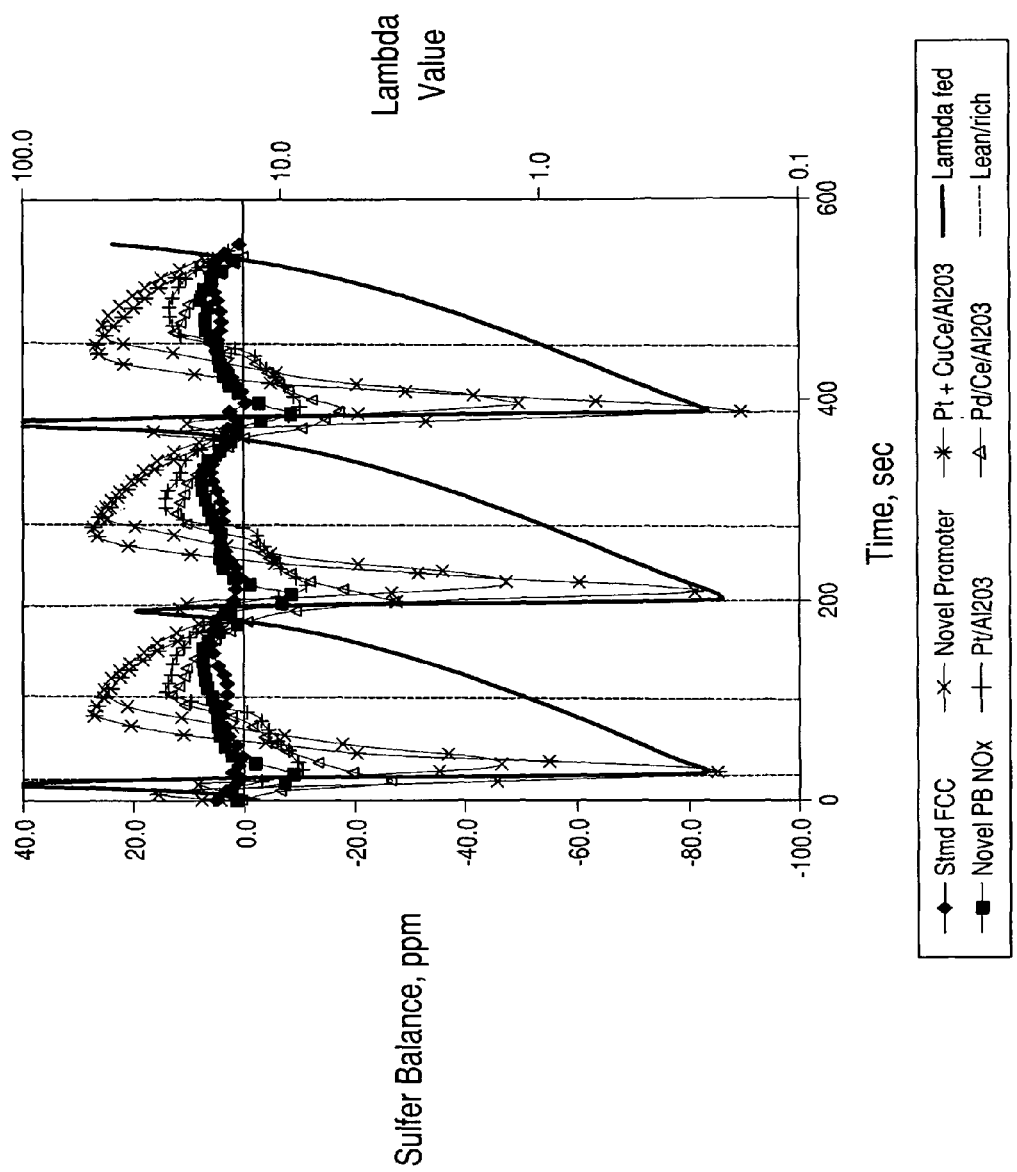

The balance of the nitrogen species are shown in then next plots, FIGS. 11A and 11B. The Pt+NOx additive blend left large amounts of ammonia unconverted but the Pd/Ce/$Al_2O_3$ promoter surprisingly converted all of the ammonia, as did the partial burn additive. The base metal promoter apparently had higher specificity for CO oxidation than $NH_3$ oxidation than the other promoters—selective oxidation. HCN was completely removed by all additives, except for a rich side residual by Pt/$Al_2O_3$. Since the rate of production of combustion products is not high at the top of the bed, this lower activity could be inconsequential; it may have been removed already in the lower portions of the bed. Lastly, the $SO_2$ and sulfur balance results for these same experimental runs are shown in FIGS. 12A and 12B. The shape of the $SO_2$ curves for the control and the partial burn additive were similar to the $SO_2$ that was fed to the reactor. The Pt-promoted NOx additive sample showed more $SO_2$ evolved than was fed during the rich time and less than was fed during the lean time, indicating an interaction. The base metal promoter had a similar but smaller effect on $SO_2$. The sulfur material balance compared the measured $SO_2$, COS and $CS_2$ to the fed $SO_2$. $H_2S$ and $SO_3$ were not measured. The +30 ppm S balance lean indicated a nearly complete adsorption of sulfate by the additives, and the −80 ppm S balance rich indicated a kinetically fast sulfate reduction to $SO_2$. Conventional SOx additives also showed a strong lean SOx uptake but the rich release was not as facile as with the NOx additives. Thus, the results imply SOx uptake at the bottom of the bed and SOx release at the top of the bed in partial burn, or deep in the emulsion phase in a full burn unit. It is now not surprising that SOx additives are less effective in partial burn.

Example 5

Figure 13A:
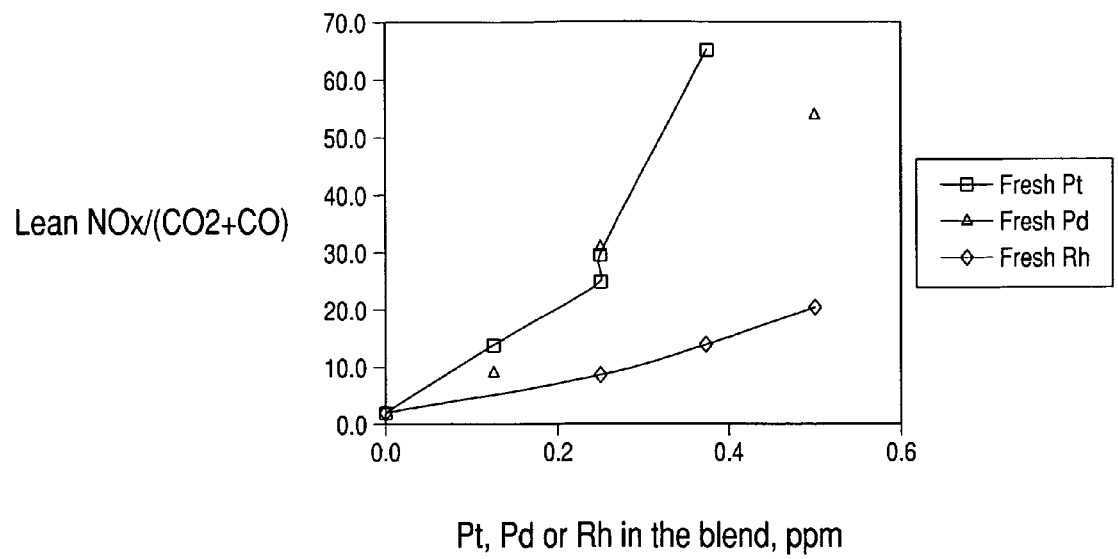
FIGS. 13A and 13B are graphs of NOx concentrations versus precious metal concentrations and $CO_2$/CO, respectively, during lambda sweep testing of precious metal CO oxidation promoters described in Example 5.
Figure 13B:
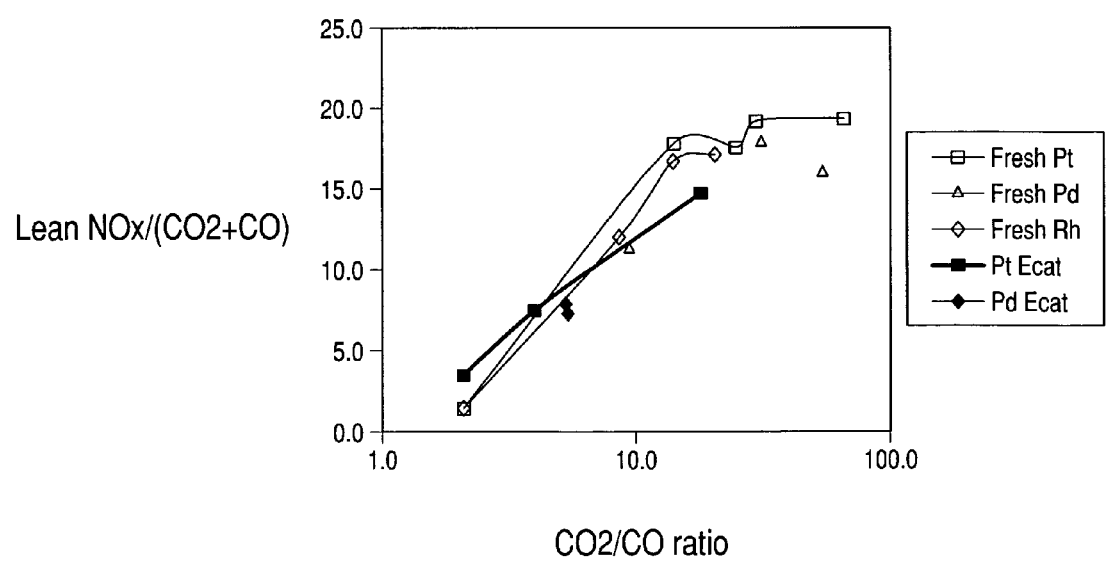

Pt, Pd and Rh are in common use in TWC automotive catalysts and Pd is reported to reduce NOx in the refinery as compared to Pt. Since there is a systematic correlation of NOx with increasing CO promotion, one may question whether Pd is more selective than Pt or whether the refinery improvement results from more careful monitoring of promoter additions. This question was addressed by testing three fresh additives with 500 ppm precious metal on alumina that were blended at several levels with FCC catalyst. The accompanying plots, FIGS. 13A and 13B, show the lean side NOx formed per unit of ($CO_2$+CO) versus metal concentration or the lean side integrated $CO_2$/CO ratio. While Pt and Rh had equivalent activity, Pd had about one third to one half of the fresh activity. Cross plotting the integrated normalized lean NOx yield against lean side $CO_2/CO$ showed that the three metals had equivalent NOx selectivity when compared on an equal CO promotion basis.

Two equilibrium catalysts from one FCC unit containing Pt or Pd were also tested. The Pt E-cat was more active as is. Some runs were done by blending down with a laboratory steamed catalyst. The unblended Pd E-cat had about half the NOx yield of the unblended Pt E-cat, but much lower $CO_2/CO$ and promotion activity. Pt E-cat runs blended down to equal $CO_2/CO$ showed the NOx yield was equivalent to the Pd, suggesting the true in-use selectivities are the same, just as in the case of the fresh catalysts. Although the refinery E-cat samples were not produced in a controlled scientific experiment, the data illustrates the utility of the lambda sweep test method for technical support of the refinery.

Example 6

Figure 14:
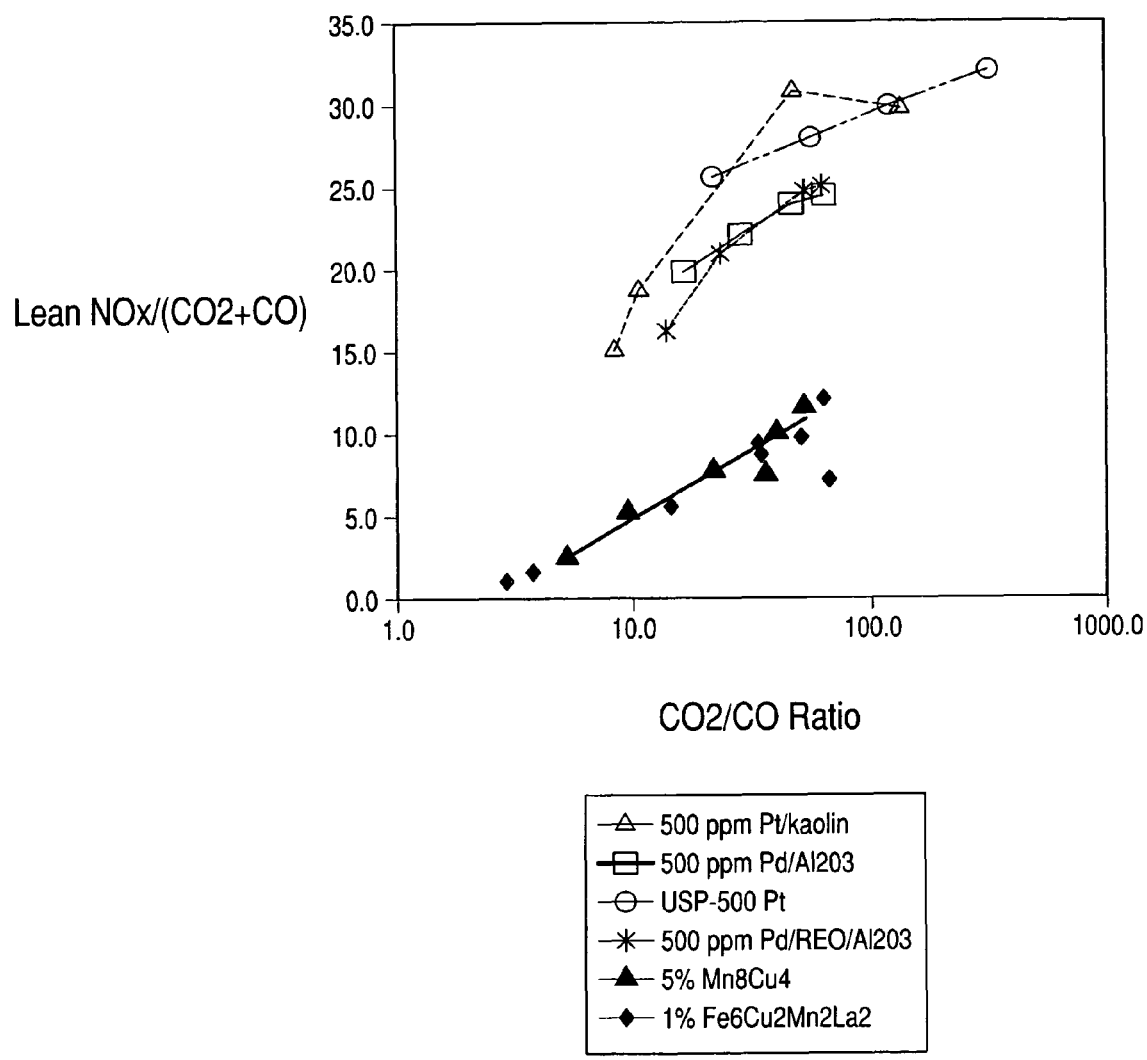
FIG. 14 is a plot found during a lambda sweep test comparing the lean side NOx production of various CO oxidation promoters having a constant CO oxidation activity as described in Example 6.

The base metal promoter of Example 4 seemed to have excellent lean side NOx selectivity. A GHSV study on two such promising additives was conducted using the methods of Examples 4 and 5, FIG. 14. Two early sets of Pt control runs were plotted together with a set run side by side (open squares) with the base metal promoters. The Pt promoters were all fresh. The base metal promoter samples were most often tested as a blend of fresh and steamed additive, but a few runs made on either all fresh or all steamed additive seemed to have the same selectivity, and so are also included in the plot. The data confirm dramatically lower NOx at constant CO oxidation activity. The test is therefore useful for the discovery of promoters and NOx reduction additives for FCC.

Example 7

Figure 15A:
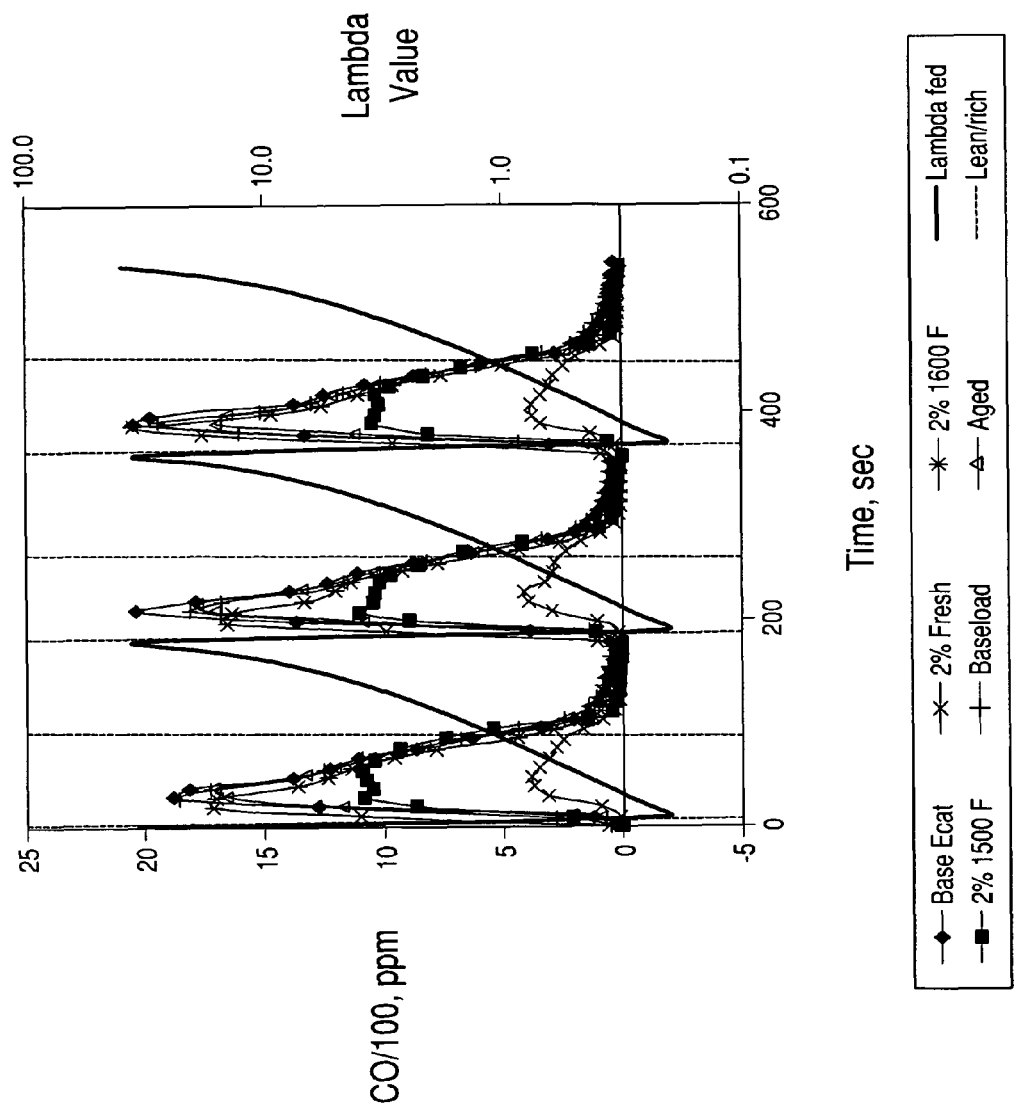
FIGS. 15A and 15B are plots of CO and $CO_2$ concentrations found during lambda sweep testing of various fresh and aged catalysts as described in Example 7.
Figure 15B:
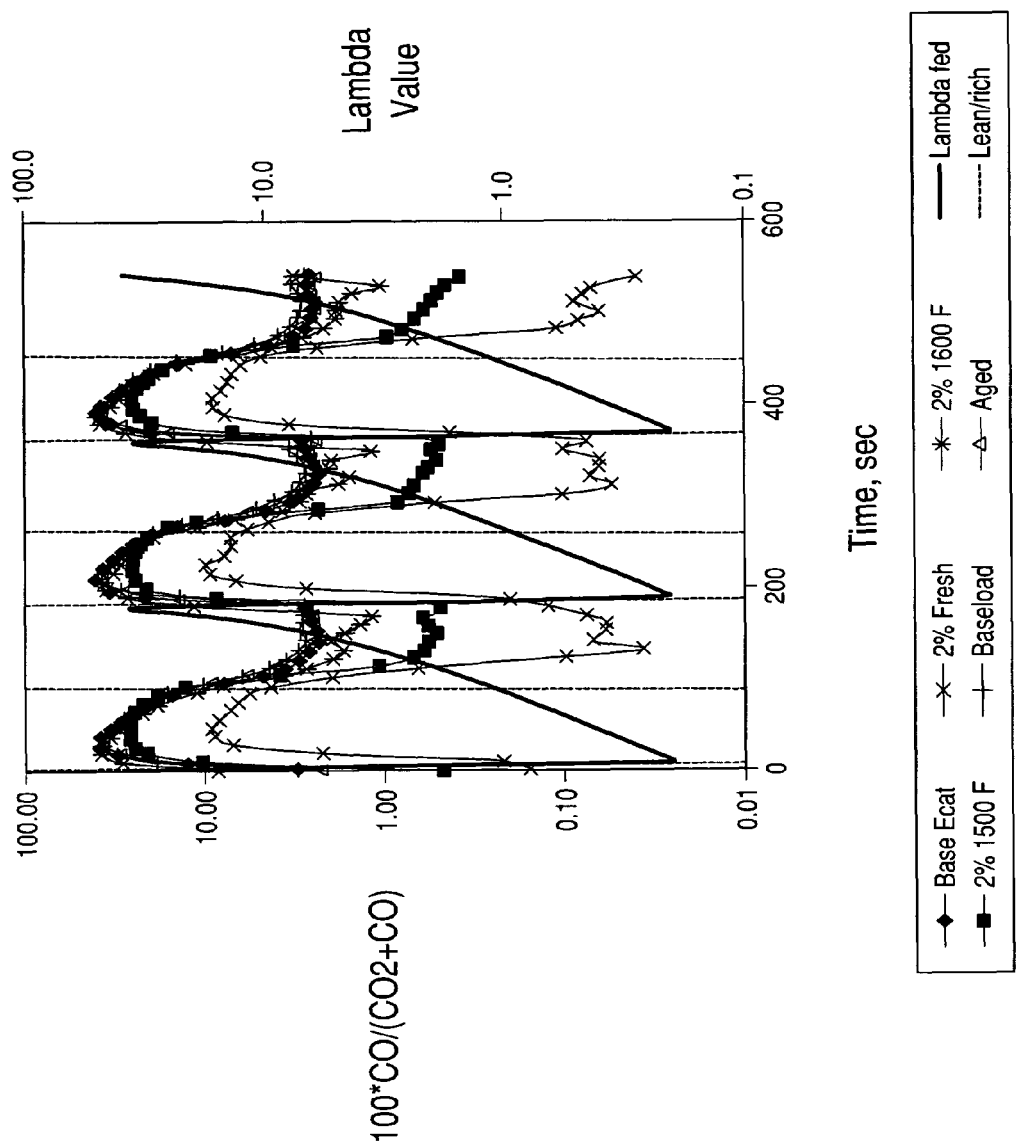
Figure 16A:
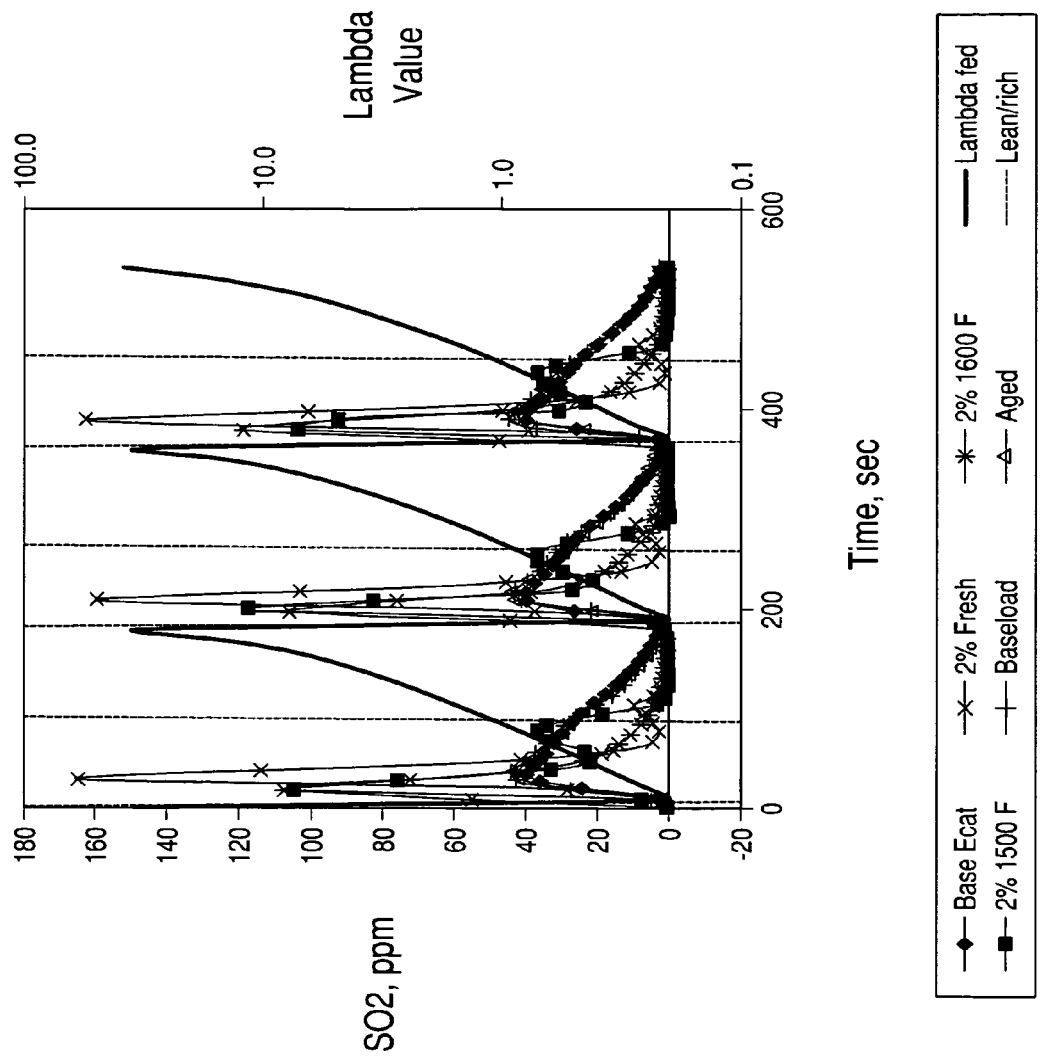

In this example comparisons were made of the CO and sulfur performance of fully promoted base equilibrium catalyst to a sample taken about 8 days after a "baseload" of a NOx additive, to a sample taken after continued additive makeup and that baseloaded sample had "aged" for another 8 days. Also compared were blends made from a base of lab-steamed catalyst containing 0.3 ppm fresh Pt additive (18 $CO_2/CO$) and the NOx additive used in the refinery trial. These blends were dosed with either 2% of "fresh," or 2% steamed at 1500° F., or 2% steamed at 1600° F. The CO data, FIGS. 15A and 15B, shows that the fresh and steamed –1500° F. additives had much more oxygen storage and CO oxidation activity than the equilibrium catalysts. The additives in the E-cats had about the same performance as the E-cat base sample without any additive. If the lab blend steamed at 1600° F. looks like it had about the right amount of oxygen storage capacity, the $SO_2$ and sulfur balance data, FIGS. 16A and 16B, shows that the equilibrium catalysts all had much less SOx uptake and release than the laboratory samples. These results illustrate the utility of the performance test in comparing oxygen storage and sulfur uptake and release. They also confirm that the simplest laboratory deactivations do not meet the need to simulate equilibrium catalyst performance. The lambda sweep reactor model's being most realistic suggests that the lambda sweep deactivation will be best able to match equilibrium catalyst and additive performance.

The invention claimed is:

1. A test method for evaluating the performance of particulate catalysts used to treat or that otherwise react with FCC regenerator flue gas comprising subjecting a catalyst to more than one lambda cycle in which the catalyst is contacted simultaneously with a mixture of feed gases comprising at least one oxidizing gas and at least one reducing gas and varying the ratio of said at least one oxidizing gas to said at least one reducing gas over the time of each cycle.

2. The test method of claim 1, wherein said at least one oxidizing gas comprises $O_2$ or air.

3. The test method of claim 2, wherein the level of $O_2$ provided for each cycle is shaped substantially to form a lambda curve wherein said lambda curve gradually increases from a minimum to a maximum and then falls from said maximum to said minimum.

4. The test method of claim 1, wherein at least three lambda cycles are conducted and wherein combustion products formed during each cycle are analyzed a plurality of times during each cycle.

5. The test method of claim 4, wherein at least ten lambda cycles are conducted.

6. The test method of claim 1, wherein the mixture of feed gases comprises $O_2$ or air as said at least one oxidizing gas, CO as said at least one reducing gas and test gases comprising $CO_2$, steam, $SO_2$, HCN, $NH_3$, NOx or mixtures of said test gases.

7. The test method of claim 1, wherein each cycle comprises a cycle time of from 0.1 second to 1 hour.

8. The test method of claim 7, wherein the cycle time comprises from 1 second to 10 minutes.

9. The test method of claim 1, wherein the catalyst is maintained as a fluidized bed.

10. The test method of claim 1, wherein said catalyst is maintained as a fixed bed.

11. The test method of claim 1, wherein said at least one oxidizing gas is $O_2$ or air and the amount of said oxidizing gas is varied over the time of said lambda cycle.

12. The test method of claim 1, wherein said at least one reducing gas is CO and the amount of said at least one reducing gas is varied over the time of said lambda cycle.

13. The test method of claim 11, wherein said at least one reducing gas is CO and said oxidizing gas and said reducing gas are varied over the time of said lambda cycle.

14. A method of aging a catalyst by contacting the catalyst simultaneously in more than one lambda cycle with a mixture of feed gases comprising steam, at least one oxidizing gas and at least one reducing gas and varying the ratio of said at least one oxidizing gas to said at least one reducing gas over time in each cycle.

15. The method of aging as in claim 14, wherein said at least one oxidizing gas comprises $O_2$ or air.

16. The aging method of claim 15, wherein the level of $O_2$ provided in each cycle is shaped substantially to form a lambda curve in which said lambda curve gradually increases from a minimum to a maximum level and then falls from said maximum to said minimum level.

17. The method of aging as in claim 14, wherein said at least eighty lambda cycles are conducted.

18. The aging method of claim 14, wherein the said mixture of feed gases comprises steam, $O_2$ as said at least one oxidizing gas, CO as said at least one reducing gas and test gases comprising $CO_2$, a sulfur-containing gas, a nitrogen-containing gas, or a mixture of said test gases.

19. The aging method of claim 14, wherein said catalyst is maintained as a fluidized bed.

20. The aging method of claim 14, wherein said catalyst is maintained as a fixed bed.

* * * * *